US010454562B2

(12) United States Patent
Graham, III et al.

(10) Patent No.: US 10,454,562 B2
(45) Date of Patent: Oct. 22, 2019

(54) MILLIMETER WAVE COMMUNICATIONS THROUGH OBSTRUCTIONS

(71) Applicant: AirVine Scientific, Inc., Bella Vista, CA (US)

(72) Inventors: Hatch Graham, III, Bella Vista, CA (US); Harry William Peterson, Concord, CA (US); Karl Douglas Triebes, Bellevue, WA (US)

(73) Assignee: AirVine Scientific, Inc., Bella Vista, CA (US)

( * ) Notice: Subject to any disclaimer, the term of this patent is extended or adjusted under 35 U.S.C. 154(b) by 0 days.

(21) Appl. No.: 15/906,161

(22) Filed: Feb. 27, 2018

(65) Prior Publication Data

US 2018/0248612 A1   Aug. 30, 2018

Related U.S. Application Data

(60) Provisional application No. 62/464,302, filed on Feb. 27, 2017.

(51) Int. Cl.
*H04B 7/15* (2006.01)
*H04B 7/155* (2006.01)
*H04L 12/10* (2006.01)

(52) U.S. Cl.
CPC .............. *H04B 7/15* (2013.01); *H04B 7/1555* (2013.01); *H04B 7/15542* (2013.01); *H04L 12/10* (2013.01)

(58) Field of Classification Search
CPC .......................... H04B 7/15542; H04B 7/1555
(Continued)

(56) References Cited

U.S. PATENT DOCUMENTS 6,016,313 A * 1/2000 Foster, Jr. ............. H04W 88/14
370/330
7,065,350 B2   6/2006 Capobianco et al.
(Continued)

FOREIGN PATENT DOCUMENTS

EP   3133847 A1   2/2017

OTHER PUBLICATIONS

K. Loshokov, PCT Search Report and Written Opinion of the International Searching Authority, Intl. Appl. No. PCT/US2018/019939, dated Nov. 15, 2018, 7 pages.
(Continued)

*Primary Examiner* — John J Lee
(74) *Attorney, Agent, or Firm* — Gavrilovich, Dodd + Lindsey LLP

(57) ABSTRACT

Apparatuses, systems, and methods that allow millimeter-wave communication signals to pass efficiently and reliably through obstructions are disclosed. An apparatus includes a first wireless transceiver and a first phased array antenna coupled to the first wireless transceiver. A second phased array antenna is also coupled to the first wireless transceiver. The apparatus additionally includes a second wireless transceiver and a third phased array antenna coupled to the second wireless transceiver. The third phased array antenna is adapted to emit a third millimeter wave beam through an obstruction. A fourth phased array antenna is also coupled to the second wireless transceiver. The fourth phased array antenna is adapted to receive a fourth millimeter wave beam through the obstruction. A controller is included in the apparatus for managing data transfer between the first wireless transceiver and the second wireless transceiver so that a fully duplexed communication path is available between the antennas.

19 Claims, 14 Drawing Sheets

(58) Field of Classification Search
USPC ........ 455/67.11, 66.1, 15, 63.3, 277.1, 279.1
See application file for complete search history.

(56) References Cited

U.S. PATENT DOCUMENTS

| | | |
|---|---|---|
| 2003/0157908 A1 | 8/2003 | Dalal |
| 2004/0110469 A1* | 6/2004 | Judd ................ G01S 19/25 455/15 |
| 2004/0174900 A1 | 9/2004 | Volpi et al. |
| 2010/0231452 A1 | 9/2010 | Babakhani et al. |
| 2011/0038356 A1 | 2/2011 | Bachrach |
| 2011/0183690 A1 | 7/2011 | Kobayakawa |
| 2011/0300885 A1 | 12/2011 | Darabi et al. |
| 2012/0135724 A1 | 5/2012 | Lewis et al. |
| 2014/0092803 A1* | 4/2014 | Picker ............ H04W 84/005 370/315 |
| 2014/0376431 A1* | 12/2014 | Li ................ H04W 52/0206 370/311 |
| 2015/0382258 A1 | 12/2015 | Schmidt |
| 2016/0037431 A1 | 2/2016 | Kohli |
| 2016/0057585 A1 | 2/2016 | Horn |
| 2016/0112970 A1 | 4/2016 | Chen et al. |
| 2016/0134356 A1 | 5/2016 | Rappaport et al. |
| 2016/0233580 A1 | 8/2016 | Aparin et al. |
| 2017/0098889 A1 | 4/2017 | Henry et al. |

OTHER PUBLICATIONS

T. Vladimirova, PCT Search Report and Written Opinion of the International Searching Authority, Intl. Appl. No. PCT/US2018/019931, dated Jun. 28, 2018, 7 pages.

Z. Nabieva, PCT Search Report and Written Opinion of the International Searching Authority, Intl. Appl. No. PCT/US2018/022422, dated Jun. 21, 2018, 6 pages.

Robert E. Wallis et al., "Tesing of the Messenger Spacecraft Phased-Array Antenna," IEEE Antennas and PRopagation Magazine, Vo. 47, Issue 1, pp. 204-209, Jul. 18, 2005.

T. Ivanova, PCT Search Report and Written Opinion of the International Searching Authority, Intl. Appl. No. PCT/US2018/027946, dated Jul. 9, 2018, 7 pages.

Christopher R. Anderson et al., "In-Building Wideband Partition Loss Measurements at 2.5 GHz and 60 GHz," IEEE Transactions on Wireless Communications, vol. 3, pp. 922-928, May 2004.

Hang Zhao et al.,"28 GHz Millimeter Wave Cellular Communication Measurements for Reflection and Penetration Loss in and around Buildings in New York City," IEEE ICC 2013—Wireless Communications Symposium, Jul. 2013, pp. 5163-5167.

Tommaso Cella et al., "MM-Wave Short Range Outdoor Links With Phased Arrays," ISCCSP 2014, Mar. 2014, pp. 214-217.

Joongheon Kim, "Fast Millimeter-Wave Beam Training with Receive Beamforming," Journal of Communications and Networks, vol. 16, No. 5, Oct. 2014, pp. 512-522.

Chang Cao et al., "Propagation Characteristic for Indoor E-Band Wideband Channels," 2016 IEEE Globecom Workshops, Jul. 2016.

"Multiple Gigabit Wireless Systems in Frequencies Around 60 GHz," Report ITU-R M.2227, International Telecommunication Union, Nov. 2011, 27 pages.

* cited by examiner

MILLIMETER WAVE COMMUNICATIONS THROUGH OBSTRUCTIONS

CROSS REFERENCE TO RELATED APPLICATIONS

This Application claims the benefit of U.S. Provisional Patent Application Ser. No. 62/464,302, filed on Feb. 27, 2017, which is incorporated by reference herein in its entirety, and the benefit of U.S. Provisional Patent Application Ser. No. 62/464,308, filed on Feb. 27, 2017, which is also incorporated by reference herein in its entirety. This application is also related to U.S. patent application 15/906148, entitled "High Speed Wireless Data Network,", filed Feb. 27, 2018, which is incorporated by reference herein in its entirety.

TECHNICAL FIELD

This disclosure generally relates to wireless communications, and more particularly, to wireless communication networks capable of operating in the millimeter wave spectrum.

BACKGROUND

The millimeter wave spectrum is the frequency band of spectrum between 30 GHz and 300 GHz. This spectrum can be used for high-speed wireless communications as seen with the latest IEEE 802.11ad Wi-Fi standard (operating at 60 GHz).

V-Band is a set of millimeter wave frequencies used for communication. Regulatory authorities in some countries permit unlicensed V-Band operation. The set of frequencies over which unlicensed V-Band operation is permitted in the U.S. is currently 57 to 71 GHz. Standards applicable to V-Band communications include IEEE 802.11ad (released 28 Dec. 2012) and IEEE 802.11ay (currently under development).

E-Band is another set of millimeter wave frequencies usable for communication. Regulatory authorities, e.g., the Federal Communications Commission (FCC), generally permit lightly-licensed operation in this band. In the U.S., E-Band operation is permitted in the following frequency bands of 71-76, 81-86, and 92-95 GHz.

The FCC also regulates numerous other unlicensed bands, including Industrial, Scientific, and Medical (ISM) bands at approximately 2 GHz and 6 GHz and other frequencies. In recent years, some of the fastest-growing uses of the ISM bands and other lightly licensed or unlicensed bands have been for short-range, low-power wireless communications systems, referred to commonly as WiFi.

A problem with some wireless networks, particularly those operating at millimeter wave frequencies, is the ability for wireless signals to penetrate obstructions, such as walls or floors within buildings or other barriers. Although millimeter-wave signals can and do pass through some obstructions, they are often degraded by doing so. Degradation may be due to attenuation, reflection and other physical processes caused by the obstruction. As frequency of transmission increases, attenuation by obstacles and free space also increases. The result is a reduction of received power, thereby limiting signal range and ability to penetrate obstructions.

SUMMARY

Disclosed herein are one or more apparatuses, systems, and methods that allow millimeter-wave signals to pass efficiently and reliably through obstructions, such as walls, barriers, free space, or the like, with significantly increased performance. These apparatuses, systems, and methods can greatly improve the reliability and performance of wireless millimeter-wave communication within buildings or other structures.

A disclosed exemplary apparatus capable of millimeter wireless communications through one or more obstructions includes a first wireless transceiver and a first phased array antenna coupled to the first wireless transceiver. The first phased array antenna is adapted to emit a first millimeter wave beam within a first frequency band. A second phased array antenna is also coupled to the first wireless transceiver. The second phased array antenna is adapted to receive a second millimeter wave beam within a second frequency band. The apparatus additionally includes a second wireless transceiver and a third phased array antenna coupled to the second wireless transceiver. The third phased array antenna is adapted to emit a third millimeter wave beam through an obstruction. The third millimeter wave beam may be within the second frequency band. A fourth phased array antenna is also coupled to the second wireless transceiver. The fourth phased array antenna is adapted to receive a fourth millimeter wave beam through the obstruction. The fourth millimeter wave beam may be within the first frequency band. A controller is included in the apparatus for managing data transfer between the first wireless transceiver and the second wireless transceiver.

A disclosed exemplary system capable of millimeter wireless communications through one or more obstructions includes a first panel having a first side opposing a second side, a first wireless transceiver mounted to the first panel, a first phased array antenna, operatively coupled to the first wireless transceiver and also mounted to the first side of the first panel. The first phased array antenna is adapted to emit a first millimeter wave beam. A second phased array antenna is also mounted to the first side of the first panel and operatively coupled to the first wireless transceiver. The second phased array antenna adapted to receive a second millimeter wave beam. Also mounted to the first panel is a second wireless transceiver. A third phased array antenna is mounted to the second side of the first panel and operatively coupled to the second wireless transceiver. The third phased array antenna is adapted to emit a third millimeter wave beam. A fourth phased array antenna is also mounted to the second side of the first panel and operatively coupled to the second wireless transceiver. The fourth phased array antenna adapted to receive a fourth millimeter wave beam.

A second separate panel, not attached to the first panel, is also included in the system. A third wireless transceiver is mounted to the second panel and operatively coupled to the second wireless transceiver. A fifth phased array antenna is mounted to the first side of the second panel and operatively coupled to the third wireless transceiver. The fifth phased array antenna adapted to emit a fifth millimeter wave beam. A sixth phased array antenna is also mounted to the first side of the second panel and operatively coupled to the third wireless transceiver. The sixth phased array antenna adapted to receive a second millimeter wave. A fourth wireless transceiver is additionally mounted to the second panel. Operatively coupled to the fourth wireless transceiver is a seventh phased array antenna, which is mounted to the second side of the second panel. The seventh phased array antenna adapted to emit the fourth millimeter wave beam to the first panel. An eighth phased array antenna is operatively coupled to the fourth wireless transceiver and also mounted to the second side of the second panel. The eighth phased array antenna adapted to receive the third millimeter wave beam from the first panel.

An example method of wireless communication is also disclosed. The method includes: receiving at a first phased array antenna a first millimeter wave beam carrying data; transferring the data through a first transceiver to a second phased array antenna; transmitting through an obstruction, using the second phased array antenna, a second millimeter wave beam carrying the data; receiving the second millimeter wave beam at a third phased array antenna located at an opposite side of the obstruction from the second phased array antenna; transferring the data through a second transceiver to a fourth phased array antenna; and transmitting from the fourth phased array antenna, a third millimeter wave beam carrying the data.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more examples of a wireless communication system and method, as well as exemplary components of such wireless communication systems. These examples, offered not to limit, but only to exemplify and teach embodiments of the components, systems, and methods, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, apparatus, device, component, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

The disclosed wireless communication systems can operate in the millimeter frequency spectrum and use phased array antennas (PAAs) with beamformers to provide very high data rates to and from end devices.

Figure 1:
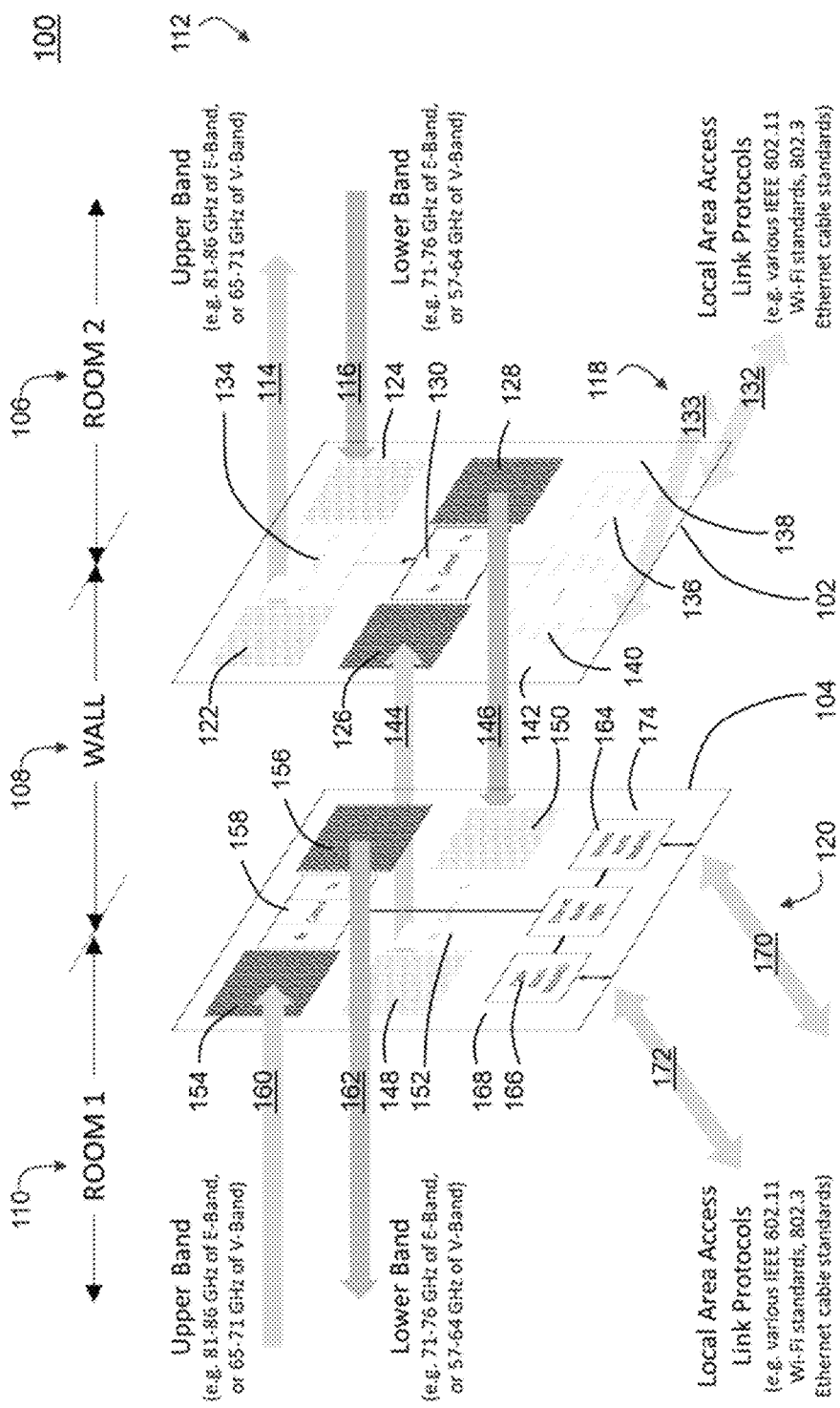
FIG. 1 is a first schematic perspective view of a first exemplary wireless communication system.

FIG. 1 is a schematic illustration of an exemplary wireless communication system 100. The system 100 includes two apparatuses (e.g., panels 102, 104), each configured to send millimeter-wave wireless signals over a wireless link through one or more obstructions, such as walls, barriers, other structures, through unobstructed air, or the like. Millimeter-wave signals can and do pass through certain obstructions, such as build walls, but the signal strength or quality may be degraded. Degradation can be caused to attenuation, reflection and/or other physical processes occurring between the obstruction and the wireless signal. Likewise, moisture content within air (humidity) also contributes to a reduction of received signal power. The wireless communication system 100 allows millimeter-wave signals to pass efficiently and reliably through one or more obstructions, with reduced degradation. Accordingly, the system 100 may improve the reliability of wireless millimeter-wave communication across increased line-of-sight range, and through obstructions, such as those found within buildings or other manmade structures.

In the example shown in FIG. 1, the first panel 102 is mounted on one side of a wall 108 (not shown), and the second panel 104 is mounted on the opposite side of the wall 108. The first and second panel 102, 104 may be generally aligned with each other. The panels 102, 104 may each include any suitable means for attaching to the wall 108, including hooks, adhesives, mounts, fasteners such as screws or nails, eyelets, wires, or the like. Furthermore, panels 102 or 104 may be mounted from overhead, such as from the ceiling, or mounted atop a floor stand (with no wall contact in either case).

The first panel 102 includes a first set of antennas having a first receiving phased array antenna (PAA) 126 directed toward the wall 108, and a first transmitting PAA 128 also directed toward the wall 108. The first PAAs 126, 128 are each in communication with a first millimeter-wave transceiver 130 included in the first panel 102. The first PAAs 126, 128 are configured to receive and transmit millimeter-wave signals 144, 146, respectively, through the wall 108 from and to corresponding first PAAs 148, 150 included on the second panel 104 as a first set of antennas. Similar to the first panel 102, the first PAAs 148, 150 are each directed toward the wall 108 and in communication with a first millimeter-wave transceiver 152 included in the second panel 104. The millimeter-wave signals 144, 146 may carry data, such as communication information, between the two panels 102, 104.

Although the signals 144, 146 of the wireless link passing through the wall 108 may be any suitable frequency band, in the example shown, the first signal 144 is in the upper portion of the V-Band between 65-71 GHz, and the second signal 146 is in the lower portion of the V-Band between 57-64 GHz. The use of multiple communication bands within a given wireless link has advantages in that it may increase reliability, increase available bandwidth and improve compatibility of the system 100.

The panels 102, 104 may communicate with other networked panels by wirelessly transferring data to other similarly configured wireless systems located nearby using millimeter-wave wireless signals. In the example shown in FIG. 1, this is done by wirelessly transmitting and receiving millimeter-wave beams 114, 116, 160, 162 within room 1 110 and room 2 106, respectively. To accomplish this, the first panel 102 includes a second set of antennas having a second transmitting PAA 122 directed toward room 2 106, and a second receiving PAA 124 also directed toward room 2 106. The second PAAs 122, 124 are each in communication with a second millimeter-wave transceiver 134 included in the first panel 102. The second PAAs 122, 124 are configured to transmit and receive millimeter-wave beams 114, 116, respectively, in the room 2 106. The millimeter-wave beams 114, 116 may carry data, such as communication information, between the first panel 102 and other networked devices (not shown). A controller included in the first panel 102 may be adapted to manage data transfer and flow between the first wireless transceiver 130 and the second wireless transceiver 134. One or more data busses of the first panel 102 may couple the transceivers 130, 134 and other components.

Although the beams 114, 116 of the wireless link passing through room 2 106 may be any suitable frequency band, in the example shown, the transmitted beam 114 is in the upper portion of the V-Band between 65-71 GHz, and the received beam 116 is in the lower portion of the V-Band between 57-64 GHz.

To permit millimeter-wave communications in room 1 110, the second panel 104 includes a second set of antennas having a second transmitting PAA 156 directed toward room 2 110 and a second receiving PAA 154 also directed toward room 1 110. The second PAAs 154, 156 are each in communication with a second millimeter-wave transceiver 158 included in the second panel 104. The second PAAs 154, 156 are configured to receive and transmit millimeter-wave beams 160, 162, respectively, in the room 1 110. The millimeter-wave beams 160, 162 may carry data, such as communication information, between the second panel 104 and other networked devices (not shown). A controller included in the second panel 104 may be adapted to manage data transfer and flow between the first wireless transceiver 152 and the second wireless transceiver 158. One or more data busses of the second panel 104 may couple the transceivers 152, 158 and other components.

Although the beams 160, 162 of the wireless link passing through room 1 110 may be any suitable frequency band, in the example shown, the transmitted beam 162 is in the lower portion of the V-Band between 57-64 GHz, and the received beam 160 is in the upper portion of the V-Band between 65-71 GHz The controllers in each panel 102, 104 may be configured so that a fully-duplexed wireless communication path 112 is available through the wall 108 and rooms 106, 110 by way of the antennas 122, 124, 126, 128, 148, 150, 154, 156 and panel transceivers 130, 134, 152, 158. In certain modes of operations, the controllers in each panel 102, 104 may be configured so that the system 100 acts as a wireless repeater, capable of wirelessly passing information between rooms 1 and 2 through wall 108.

Each of the panels 102, 104 may also include local wireless and/or cable interfaces, e.g., access control units (ACUs) 142, 174, respectively, for communicating with one or more terminal networked devices in room 2 and 1, respectively. Each of the local interfaces may include an access control unit (ACU) that includes certain functions and components that serve to manage and deliver data packets, e.g., Ethernet packets, of information from the wireless communication path 112 to terminals in the local rooms 1 and 2 (rooms 110 and 106) of the panel locations. Similarly, the ACU functions and components serve to receive information from the local terminals and insert the packets of information into the information flow over the wireless communication path 112.

The components of the ACU of the first panel 102 may include an Ethernet packet manager 136 and one or more access modules, e.g., a wireless access module 140 and a cable access module 138. The components of the ACU of the second panel 104 may include an Ethernet packet manager 166 and one or more access modules, e.g., a wireless access module 164 and a cable access module 168. Software/firmware may also be used to control communications between the modules and the packet manager in each panel 102, 104 over respective data busses. The Ethernet packet managers 136, 166 may each be implemented using a commercially-available Ethernet switch, such as an Ethernet switch available from Cavium, Inc. The access modules 138, 140, 164, 168 in each panel 102, 104 may each include commercially-available chipsets and/or software/firmware that implement standards-based local communication protocols, such as one or more of the IEEE 802.11 Wi-Fi standards or IEEE 802.3 Ethernet cable standards. Each of the ACUs may also include one or more antennas and/or cable ports As shown in FIG. 1, each Ethernet packet manager 136, 166 is coupled to the transceiver 130, 134, 152, 158, in its respective panel 102 or 104 by one or more data busses.

The functions of the ACU in each panel may include a 1) Ethernet switch and associated packet management buffers, buses, and memory, 2) wireless modules (transceivers) that adhere to IEEE 802.11 protocol (various versions of 802.11 depending on the panel configuration), and 3) Ethernet ports for cable connections. In each panel 102, 104, data that is transmitted and received from the bus from the upper two transceivers 130, 134, 152, 158 is encapsulated Ethernet packet information at a baseband frequency. The Ethernet processor in each packet manager 136, 166 de-encapsulates the data, decides if its destination is within the local area its respective room (based on destination address information included in the packet). If not, the packet manager sends the packet back up to the transceivers 130, 134, 152, 158 so that the packet continues its journey on the wireless communication path 112. If the data's destination is the local area, a controller included in the respective packet manager 136, 166 determines whether it is to be sent over a wireless access module or out the Ethernet port of a cable access module. Conversely, information (data packets) that comes inbound from the local end terminal devices is encapsulated into one or more Ethernet packets by the ACU and placed up and on its way to the upper transceivers so that it may be transferred on the wireless communication path 112.

Although FIG. 1 shows ACUs including both wireless and cable access modules, any suitable configuration of access modules may be used in each panel. For example, only one wireless access module may be included in some panel configurations with no cable access module. Other panel configurations may include only one or more cable access modules with no wireless access module, while other panel configurations may include three or more access modules, either wired or wireless.

Although the local access communication paths 118, 120 may each be any suitable frequency band or protocol, in the example shown, the local wireless paths 132, 170 may each be IEEE 802.11 Wi-Fi signals (any suitable version of Wi-Fi), Bluetooth, or the like; and the local wired paths 133, 172 may each be IEEE 802.3 Ethernet signals or the like. Alternatively, the local communication paths 118, 120 may comply with any suitable FCC and International agency wireless and cable standards.

The wireless interfaces 142, 174 may be omitted from the first and second panels 102, 104 in some configurations of the system 100.

The controller included in each of the panels 102, 104 may be any suitable means for controlling the operation of the respectively panel, as well as the system 100. For example, the controller may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The controller may also include memory. The memory and processor may be combined as a single chip.

The functions of the controller may be implemented in hardware, software, firmware, or any suitable combination thereof. If implemented in software, the functions may be stored as one or more instructions or code on a computer-readable medium (e.g., memory) and executed by a hardware-based processing unit (e.g., a processor). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The data busses described herein may be high-speed digital busses constructed from commercially-available components, including commercially-available hardware, software and/or firmware. Alternatively/additionally, one or more of the data busses may include custom components for providing high-speed data transfers.

Figure 2A:
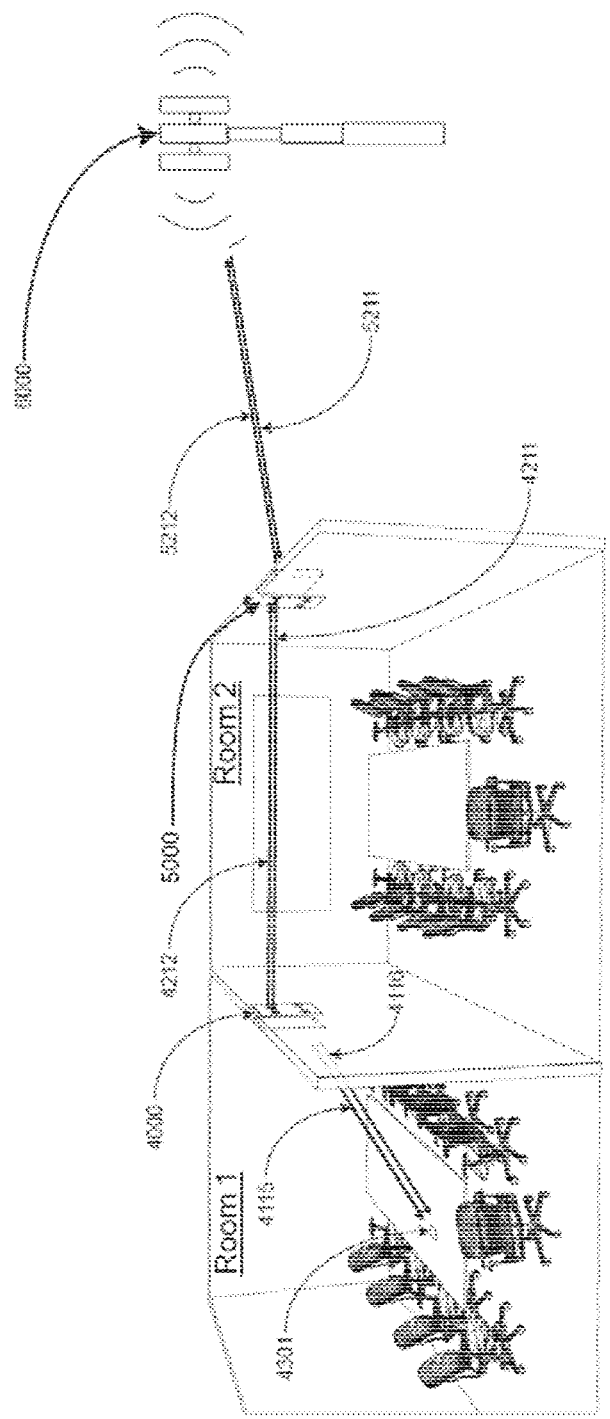
FIG. 2a is a contextual schematic illustration of a first exemplary wireless communication network in an enterprise environment, which includes a disclosed wireless communication system.

FIG. 2a is a contextual schematic illustration of an exemplary wireless communication network in an enterprise environment, which includes one or more of the disclosed wireless communication systems. The network includes two wireless systems 4000, 5000 each configured to provide wireless millimeter-wave communications through obstructions, such as walls, in an exemplary enterprise. The system 4000 is mounted on an interior wall. The system 5000 is mounted on an exterior wall. Each of the systems 4000, 5000 may include any of the two-panel wireless communication systems disclosed herein, for example, the system 100 disclosed in connection with FIG. 1 or system 4000 described in further detail below.

As shown in FIG. 2a, the system 4000 is installed on the interior wall between room 1 and room 2. Installation does not require actually cutting a hole in the wall. This is particularly advantageous in situations where walls contain asbestos or other materials that generate hazardous dust when cut, drilled or abraded. Installation can be achieved by simply attaching the two panels which comprise system 4000 to either side of the wall. The attachment of panels to the wall may be performed using any suitable means, for example, by adhesive or using nails, screws, hooks, eyelets or the like. The two panels may be aligned in order achieve optimal performance. The panel alignment may be achieved by use of built-in auto-alignment circuitry included in the panels of the system 4000 or by portable instrumentation developed to aid the alignment procedure.

The system 5000 serves as gateway for the enterprise buildings, as it allows communications from the enterprise to the Internet cloud via an external device, for example an enterprise server or a remote base station 6000. In this example, millimeter-wave beams 5211 and 5212 comprise a duplex frequency domain division (FDD) connection between the first system 5000 of the enterprise network and the Internet cloud via a remote base station 6000. Although the beams 5211, 5212 of the wireless link between system 5000 and base station 6000 may be any suitable frequency band, in the example shown, the transmitted beam (uplink) 5212 may be in the E-Band between 81-86 GHz, and the received beam (downlink) 5211 may be in the E-Band between 71-76 GHz.

A second wireless link between system 5000 and system 4000 allows communications between the two systems 4000, 5000. In this example, millimeter-wave beams 4211, 4212 of the second link provide a duplex FDD connection between the first system 5000 and the second system 4000. Although the beams 4211, 4212 of the second wireless link may be any suitable frequency band, in the example shown, the transmitted beam 4212 from the second system 4000 to the first system 5000 may be in the E-Band between 81-86

GHz, and the received beam 4211 from the first system 5000 to the second system 4000 may be in the E-Band between 71-76 GHz.

The first panel (in Room 1) of the second system 4000 provides additional links 4115 to one or more terminal devices 4301 in the second room. The terminal devices 4301 may be any wirelessly enabled device, for example, a computer such as a laptop, smartphone, cable box, gaming console, or non-wireless terminals equipped with standard Ethernet interface ports.

Figure 2B:
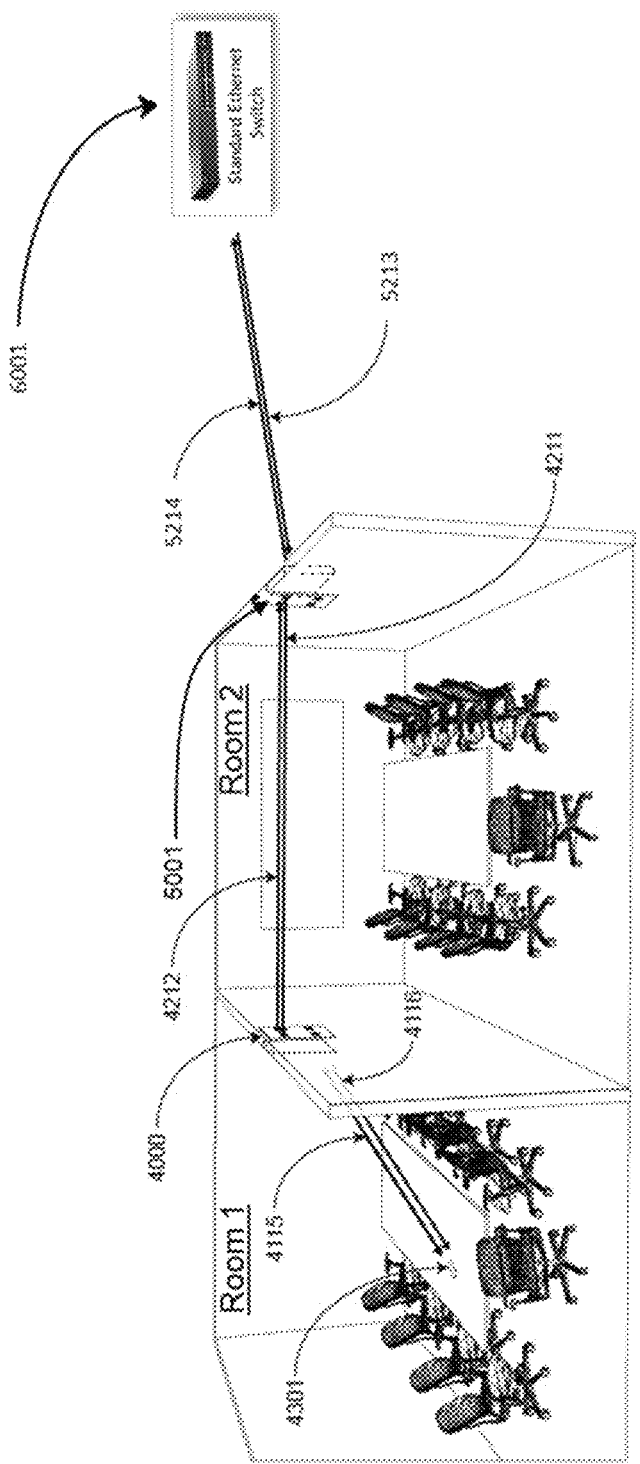
FIG. 2b is a contextual schematic illustration of a second exemplary wireless communication network in an enterprise environment, which includes a disclosed wireless communication system.

FIG. 2*b* is a contextual schematic illustration of an exemplary wireless communication network in an enterprise environment, which includes one or more of the disclosed wireless communication systems. The network includes two wireless systems 4000, 5001 each configured to provide wireless millimeter-wave communications through obstructions, such as walls, in an exemplary enterprise. Similar to FIG. 2*a*, the system 4000 is mounted on an interior wall. However, in the example of FIG. 2*b*, the system 5001 is also mounted on an interior wall and connects to a gateway in the configuration of a standard Ethernet switch 6001. In this manner, switch 6001 serves as the gateway for the enterprise infrastructure, as it allows communications from the enterprise to the Internet cloud via the switch 6001.

Each of the systems 4000, 5001 may include any of the two-panel wireless communication systems disclosed herein, for example, the system 100 disclosed in connection with FIG. 1 or systems 4000, 7000 described in further detail below.

Figure 3:
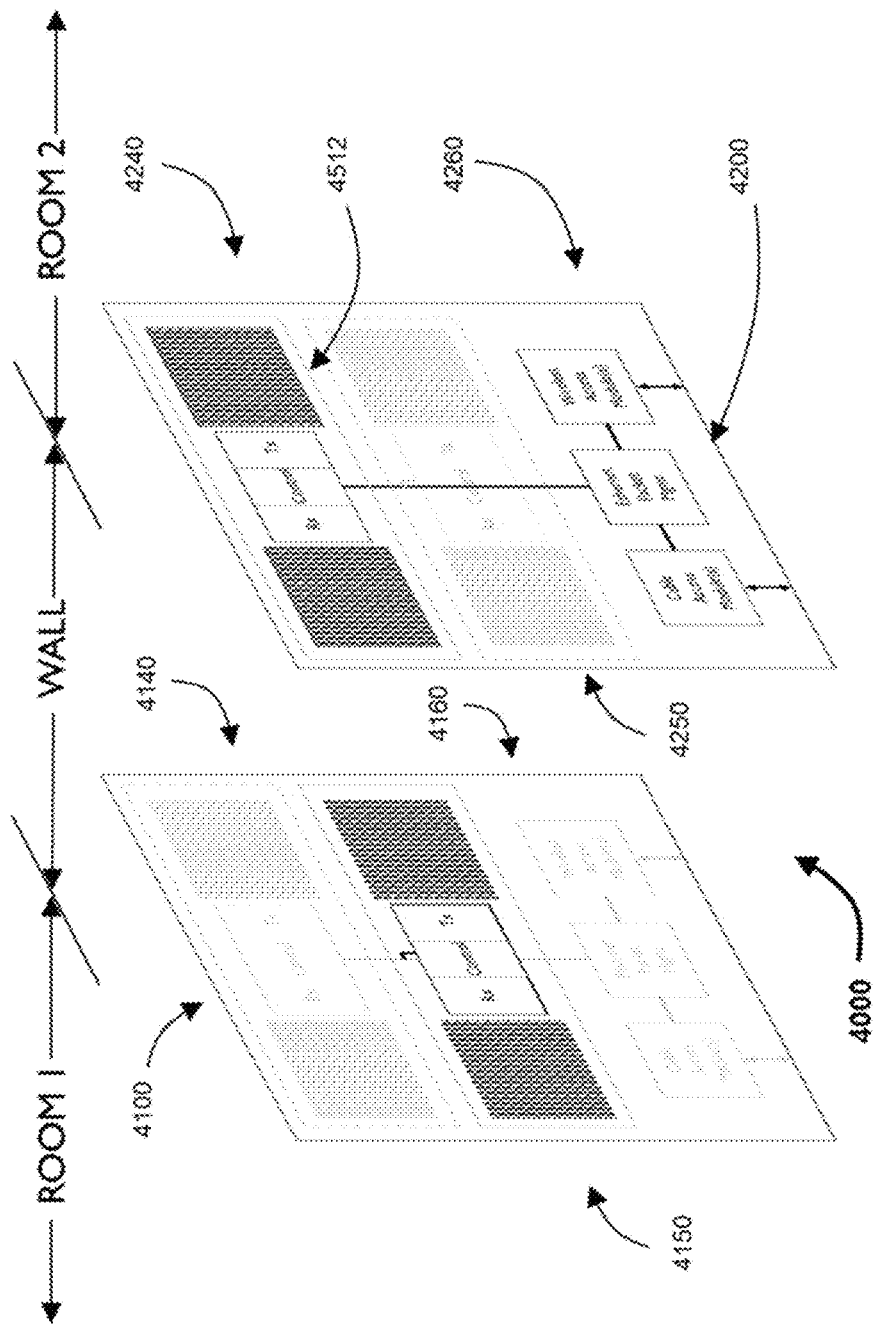
FIG. 3 is a second schematic perspective view of the first exemplary wireless communication system of FIG. 1, includable in the wireless networks disclosed herein.

FIG. 3 is a second schematic perspective view of an exemplary wireless communication system 4000 includable in the wireless networks disclosed herein, e.g., the network shown in FIGS. 2*a-b*. The system 4000 may include the same components and functions of the system 100 shown in FIG. 1. The system 4000 may be replicated and used as both systems 4000, 5001 of the network depicted in FIG. 2*b*.

The system 4000 includes two separate panels 4100, 4200, which are each mounted to opposite sides of a wall separating room 1 and room 2, respectively. The panels 4100, 4200 are substantially aligned with each other so that millimeter-wave signals can be successfully transfer data between the panels 4100, 4200 through the wall. The system 4000 may be installed on two sides of a wall that separates room 1 and room 2. The height of the installation may be seven feet above the floor, but installation height is not constrained to any height.

Installation, alignment, and configuration of the system 4000 may be controlled by a separate wand or handheld device that is in wireless communication with the panels 4100, 4200. The wand may include a user interface, a display, and a Bluetooth interface that can pair with each panel 4100, 4200. For example, the wand may be a smartphone with an operating system and application software for interfacing with the panels 4100, 4200.

Installation and alignment of the panels 4100, 4200 on a wall can be accomplished using the following method: 1) panel 4100 is attached to the wall, and connected to power (wall outlet) and turned on; 2) using the Bluetooth link, the panel 4100 and wand are paired; 3) the second panel 4200 is temporarily attached to the other side of the wall, and connected to power (wall outlet) and turned on; 4) the second panel 4200 is moved on the wall until a green "Alignment OK" indicator is displayed by the wand; 5) the second panel 4200 is then permanently attached to the wall; 6) a "join network" button is then pushed on the wand, causing the first and second panel 4100, 4200 to establish communications between each other and other network elements over the wireless links; and 7) the wand displays an "Installation OK" message once the panels 4100, 4200 communicate to the wand over the Bluetooth link that they have successfully connect to the network.

Once installed, the panels 4100 and 4200 make up the system 4000.

The system 4000 may transmit and receive information at V-Band or E-Band frequencies to/from room 1 and room 2. The system 4000 may also transmit and receive Ethernet packet traffic within room 1 and room 2 via wireless or cable access control units (ACUs) 4260, 4160.

In this example, each of the panels 4100, 4200 contains two circuits of phased array antennas with embedded transceiver and control electronics (PAAXs) and one ACU. With the advent of deep submicron CMOS technology, phased array antennas with embedded transceiver and control electronics (PAAX) have become a practical implementation.

The first panel 4100 includes a first PAAX 4140 (which may include components 154, 156, 158 of FIG. 1), a second PAAX 4150 (which may include components 148, 150, 152 of FIG. 1), and an ACU 4160 (which may include components of ACU 174 of FIG. 1). The first PAAX 4140 has two phased array antennas on one side of the panel 4100 directed toward room 1. The second PAAX 4150 has two phased array antennas on the other side of the panel 4100 facing the wall. The ACU 4160 has Ethernet packet management, wireless and cable interface modules for linking to terminals within the rooms, as described in connection with FIG. 1.

Likewise, the second panel 4200 includes a first PAAX 4240 (which may include components 122, 124, 134 of FIG. 1), a second PAAX 4250 (which may include components 126, 128, 130 of FIG. 1), and an ACU 4260 (which may include components of ACU 142 of FIG. 1). The first PAAX 4240 has two phased array antennas on one side of the panel 4200 directed toward room 2. The second PAAX 4250 has two phased array antennas on the other side of the panel 4200 facing the wall. The ACU 4260 has Ethernet packet management, wireless and cable interface modules for linking to terminals within the rooms.

The system 4000 may be configured so that the first panel 4100 provides full duplex FDD on the V-Band or E-Band frequencies using the first PAAX 4140 in room 1; and full duplex FDD on the V-Band or E-Band frequencies using the second PAAX 4150 through the wall. And the second panel 4200 provides full duplex FDD on the V-Band or E-Band frequencies using its first PAAX 4240 in room 2; and full duplex FDD on the V-Band or E-Band frequencies using the second PAAX 4250 through the wall.

Each PAAX has control circuitry for electrically setting beamformer parameters. Beamformer parameters may control either the width of the beam, or the direction in which the beamformer points, or both. The control may be asserted by the following means: 1) embedding switches within the PAA and using such switches to reconfigure conductive elements which comprise the PAA; 2) phase-shifting the signals sent to or received from elements of the PAA; and/or 3) digitally generating incremental delay among the signals sent to individual antenna elements.

Crosstalk among the beams is reduced by in the following ways. First, the physical design of the panels minimizes the level of Tx fields that are seen by Rx PAAs. Second, reflectors of millimeter-wave radiation may be embedded within the panels 4100, 4200. Thickness of the reflectors is optimized and simulated in order to ensure that the efficiency benefit gained thereby is not cancelled by the signal degradation caused by multipath propagation introduced by said reflectors. And third, attenuators may be embedded within the panels. The attenuators may be implemented as metamaterials or by conventional lossy materials.

Each PAAX may include beamforming-control circuits, transmitter-drive circuits, RF lens and enclosure elements.

Design of the V-Band and E-Band antennas used within the PAAXs is now discussed. In some configurations, there is no need for a Tx/Rx switch because Tx and Rx antenna elements are implemented as subarrays within each PAAX. Elimination of Tx/Rx switch results in elimination of losses and parasitics associated with the switch. Consequently, link margin is improved.

Each PAAX may be an adaptive array system, which uses adaptive nulling, beam forming, and beam steering. Because antenna elements as well as transceiver elements are embedded within each PAAX, there may be no need for a power combiner or transmission line in the Tx antenna array. Economic costs and performance degradation associated with the power combiner and said transmission line can thus be avoided. Each antenna may be a dedicated integral phased array antenna as defined by European Telecommunications Standards institute (ETSI). It features dynamic auto-alignment and installation alignment. The antenna is not required to be a stand-alone antenna or a selectable beam antenna. However, some configurations of the system 400 can be built using selectable beam antennas or stand-alone antennas.

In other embodiments, each panel 4100, 4200 may have a greater or fewer number of PAAXs and each panel 4100, 4200 may have a different number of PAAXs than the other panel.

Figure 4:
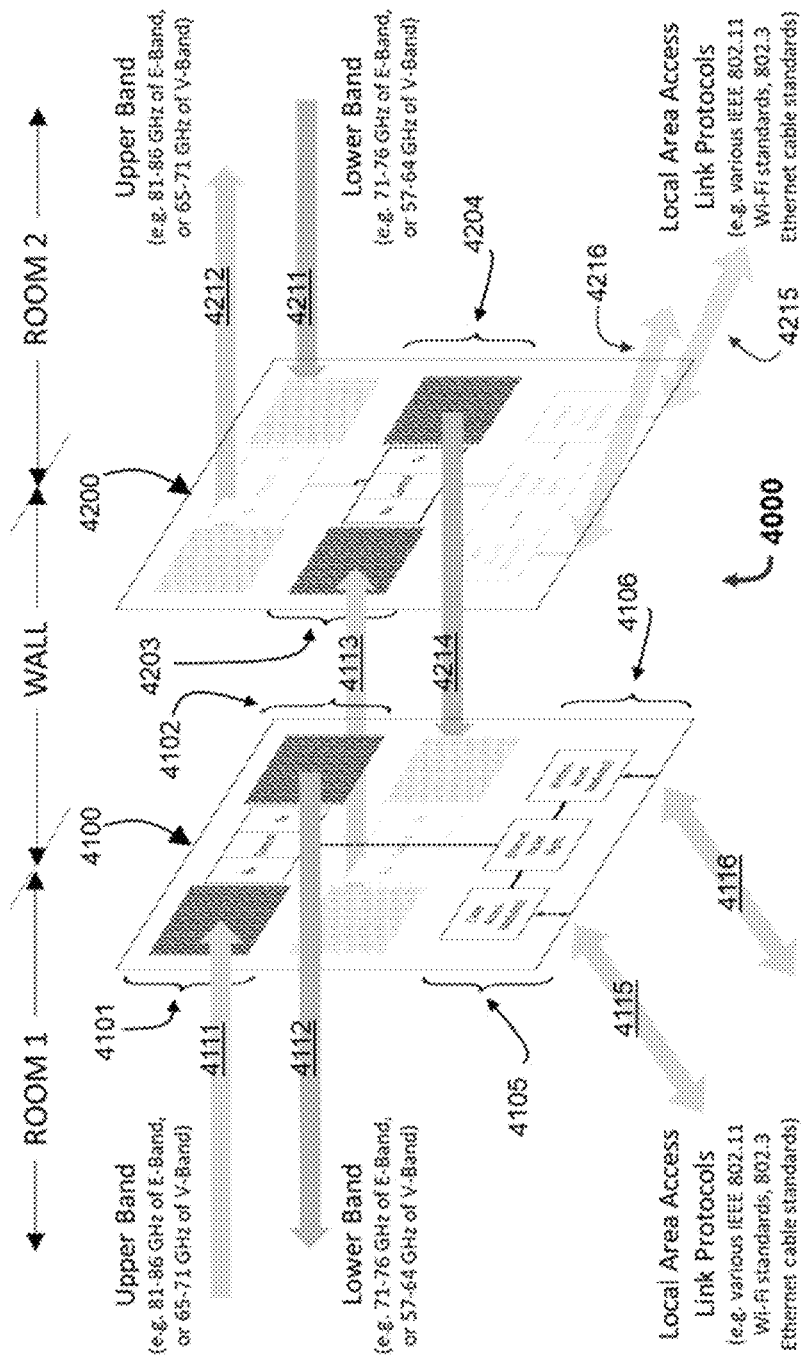
FIG. 4 is a third schematic perspective view of the first exemplary wireless communication system of FIG. 1.
Figure 5:
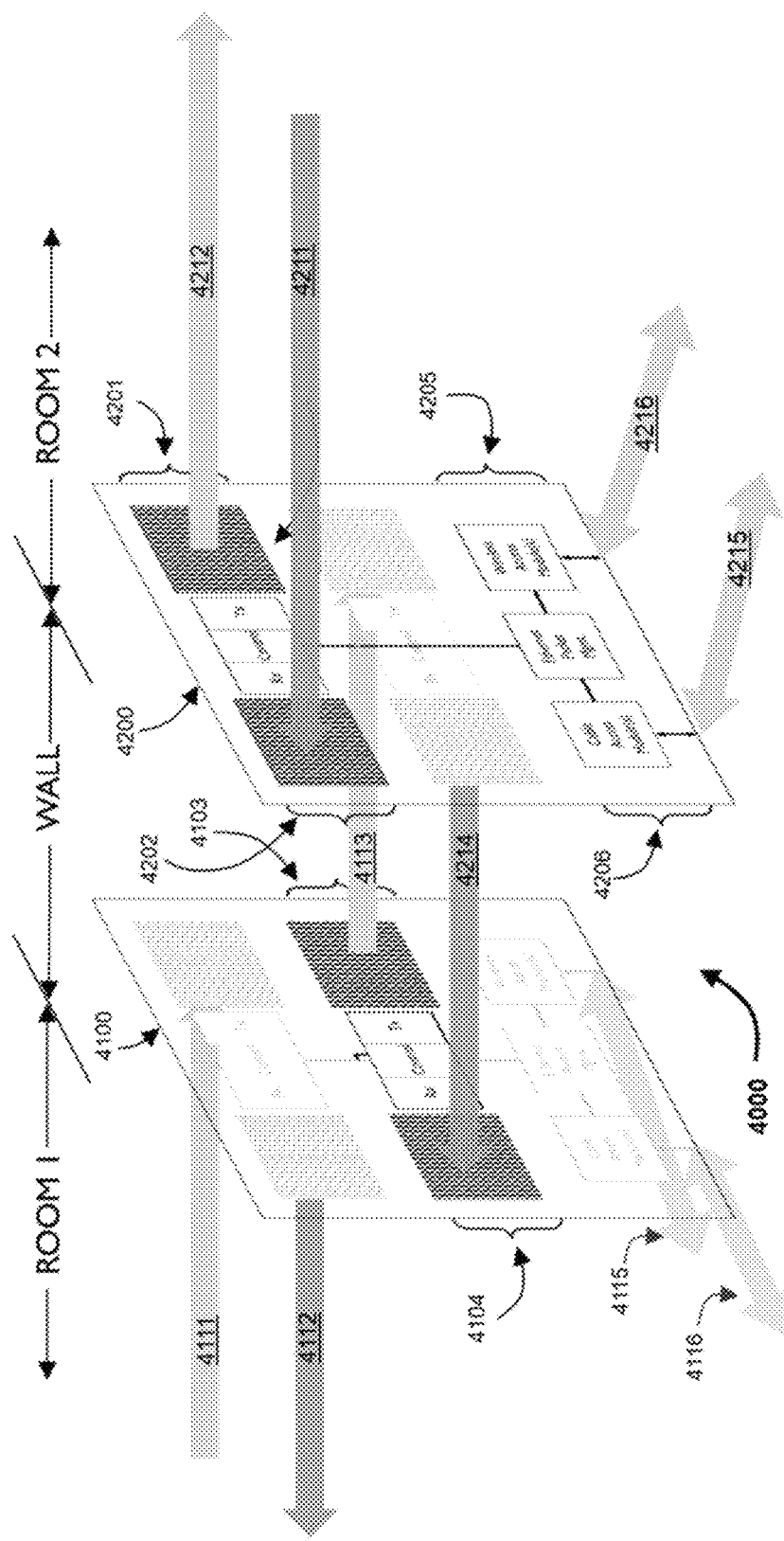
FIG. 5 is a fourth schematic perspective view of the first exemplary wireless communication system of FIG. 1.

FIGS. 4 and 5 are additional schematic perspective views, respectively, of the exemplary wireless communication system 4000. These views show further details of the wireless beam data flows and structure of the system 4000. Table 1 summarizes the panels and their transmit (Tx) and receive (Rx) components by the element numbers shown in FIGS. 4 and 5, along with the element numbers of the corresponding millimeter wave beams.

TABLE 1

Rx and Tx components of panel.

| Panel | Ref number | Frequency <GHz> | Function | Direction | Beam number | PAAX number |
|---|---|---|---|---|---|---|
| 4100 | 4101 | 65-71 | RX | Room 1 | 4111 | 4140 |
| 4100 | 4102 | 57-64 | TX | Room 1 | 4112 | 4140 |
| 4100 | 4103 | 65-71 | TX | Wall | 4113 | 4150 |
| 4100 | 4104 | 57-64 | RX | Wall | 4214 | 4150 |
| 4100 | 4105 | Local wired | TX/RX | Room 1 | 4115 | 4160 |
| 4100 | 4106 | Local wireless | TX/RX | Room 1 | 4116 | 4160 |
| 4200 | 4201 | 57-64 | RX | Room2 | 4211 | 4240 |
| 4200 | 4202 | 65-71 | TX | Room2 | 4212 | 4240 |
| 4200 | 4203 | 65-71 | RX | Wall | 4113 | 4250 |
| 4200 | 4204 | 57-64 | TX | Wall | 4214 | 4250 |
| 4200 | 4205 | Local wireless | TX/RX | Room2 | 4215 | 4260 |
| 4200 | 4206 | Local wired | TX/RX | Room2 | 4216 | 4260 |

In the example system 4000 shown in FIGS. 3, 4 and 5, there are three wireless links, each having a pair of beams. As shown in FIG. 4, in the first link wireless beams 4111 and 4112 carry traffic, including data and control information, that is flowing between the system 4000 and other wireless communication system(s) located within room 1. In this example, the traffic is transmitted and received at V-Band frequencies, for example, those shown in Table 1. Also at V-Band frequencies, beams 4113 and 4214 of the second link carry information which flows through the wall between the panels 4100 and 4200 located in room 1 and room 2. Beams 4212 and 4211 of the third link carry traffic which is flowing between the system 4000 and other system(s) in room 2. The traffic carried by the first, second and third wireless links may be transmitted and received at V-Band frequencies, as shown in Table 1. In this example, signals 4115 and 4116 of the fourth link carry traffic at local wired or wireless band frequencies flowing between PAAX 4160 of the first panel 4100 and terminal access points within room 1. Also in this example, signals 4215 and 4216 of the fifth link carry traffic at local wired or wireless band frequencies flowing between PAAX 4260 and terminal access points within room 2. As described above in connection with FIG. 1, the local access communication paths 4115, 4116, 4215, 4216 may each be any suitable frequency band or protocol, for example, the local wireless 4116, 4215 may each be IEEE 802.11 Wi-Fi signals (any suitable version of Wi-Fi), Bluetooth, or the like; and the local wired paths 4115, 4216 may each be IEEE 802.3 Ethernet signals or the like. Alternatively, the local communication paths may comply with any suitable FCC and International agency wireless and cable standards.

Each of the panels 4100, 4200 includes a plurality of millimeter-wave receivers (Rx's) and a plurality of millimeter-wave transmitters (Tx's). The phased-array antennas of each panel 4100, 4200 may be permanently electrically connected to either Rx or Tx RF front end circuitry, respectively. Correspondence between RF circuits 4101-4106 and 4201-4206 and area of the panels is shown in FIGS. 3, 4 and 5 and given in Table 1.

Each of the Rx circuits 4101, 4104, 4106, 4203, 4202, 4205 generates a respective digital bit stream that corresponds to the waveform of the millimeter-wave signal (beams) incident on the corresponding antenna array. Error correction may be performed on each of the bit streams within the transceiver associated with the PAAX that contains the Rx circuit.

The data flow through the wall uses the second wireless links represented as beams 4113 and 4214. In order to reduce attenuation and other forms of signal degradation, the beams 4113, 4214 are generally normal to the surface of the wall. PAA elements of each PAAX 4150, 4250 of the panels 4100, 4200 are aligned to ensure that each Rx PAA captures the greatest possible proportion of the energy emitted by corresponding Tx PAA of the opposing panel. The proportion of energy received may depend on the exact shape of beams generated by the Rx and Tx PAAs on the panels 4100, 4200. Link margin can be adjusted by modifying the antenna gain, power and noise figure of the Rx PAA and corresponding Tx PAA. For example, antenna gain can be increased by using a larger number of elements within either or both corresponding PAAs of a given beam path. Data passing through the wall may transmitted wirelessly using V-Band, or in other configurations, E-Band.

The system 4000 contains digital circuitry for management of dataflow between bitstreams of the various Rx circuits and digital inputs of the Tx circuits. The digital circuitry also provides leaf-level management of beamforming activity and system power. The digital circuitry may include one or more controllers in each panel 4100, 4200, such as the control described in connection with FIG. 1.

The disclosed wireless systems, including the systems 100, 4000, provide certain advantages. For example, an advantage provided by the system 4000 is the elimination of wires and cables that legacy networks use to carry communication signals because the system 4000 allows millimeter wireless communication links to pass through walls. Using the system 4000 allows millimeter-wave wireless links to replace the wires and cables. This greatly reduced installation costs to deploy the latest, high-speed digital communication technology in commercial environments. Beamformers may establish connections between nodes in a network, instead of wires or cables. Phase-array antennas with embedded transceiver electronics, such as the PAAX disclosed herein, improve the security, economy and performance of the beamformers.

A second advantage delivered by the disclosed systems is to greatly improve the data rates available in legacy wireless networks. A third advantage delivered by the disclosed systems is a reduction in eavesdropping and security, since the wireless signals can be narrow beams. A fourth advantage delivered by the disclosed systems is fast and scalable communication path tracking that may improve network speed. A fifth advantage delivered by the disclosed systems is to greatly improve penetration through walls, and when combined with other similar systems into a network, to penetrate through multiple walls and barriers commonly encountered within business enterprise environments such as buildings. The walls and obstructions might otherwise collectively increase the path loss of a signal to a point of signal failure. The disclosed systems also facilitate implementation of software-defined networks and self-organizing networks.

Figure 6:
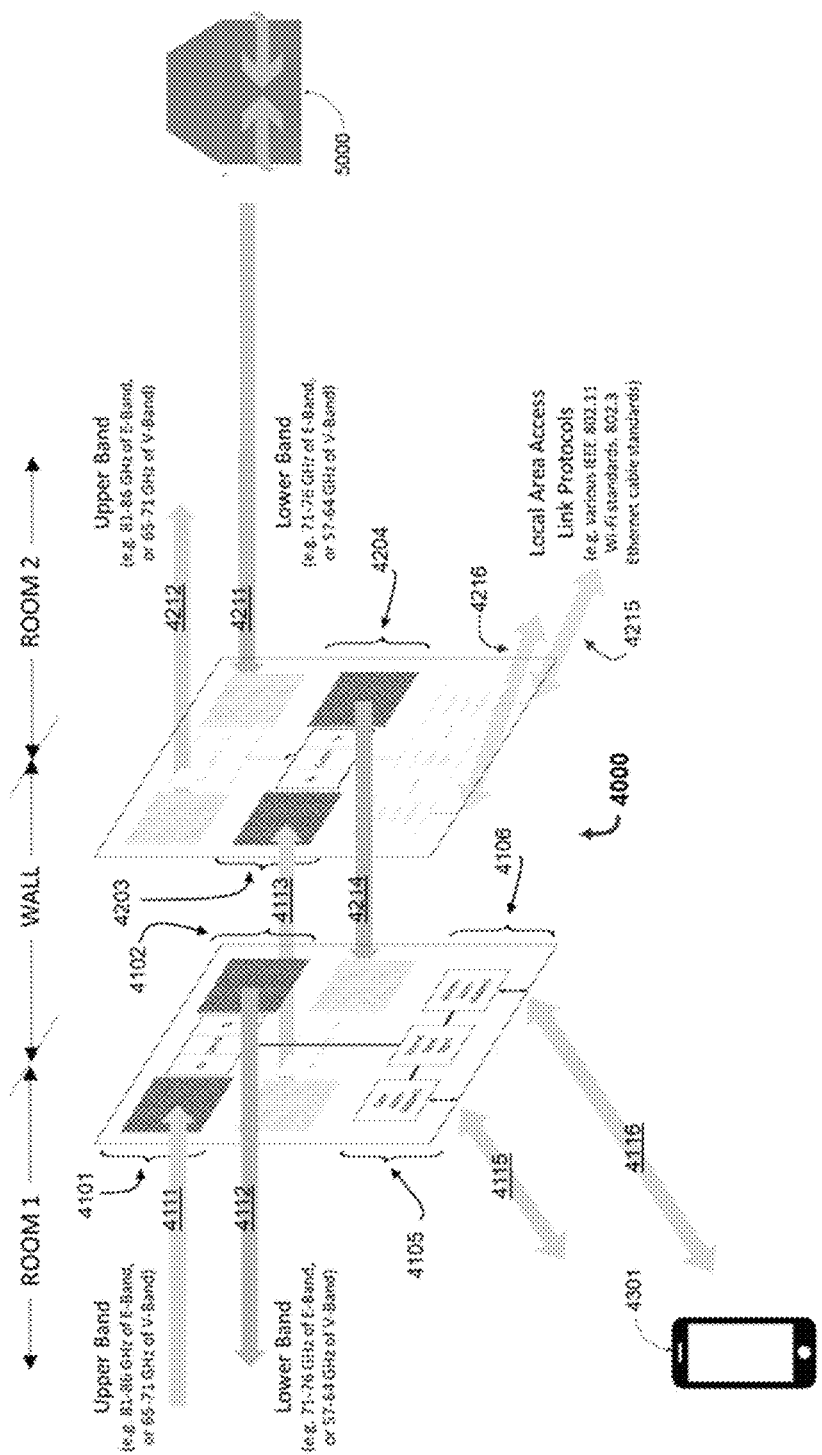
FIG. 6 is a schematic illustration of wireless communications involving the first exemplary wireless communication system.

FIG. 6 is a schematic illustration of wireless communications involving the wireless system 4000. More particularly, FIG. 6 shows communication between the end terminal 4301, which may be a WiFi-enabled mobile phone, in room 1 and wireless communication system 5000, which may include a standard Ethernet switch, in room 2.

The panels 4100 and 4200 may be physically equivalent, having essentially the same components and structures. The terminal device 4301 can send and receive wireless signals 4116 to PAA 4106. Thus, full-duplex communication is achieved between device 4301 and panel 4100 of system 4000.

The terminal device 4301 in room 1 can use system 4000 as a relay in order to communicate with the gateway system 5000 in room 2. In order to wirelessly connect device 4301 to gateway system 5000, the follow process may occur (referring back to FIG. 3): 1) establish a wireless connection between transceivers in device 4301 and the transceivers in PAAX 4160; 2) send the data over one or more internal busses in the panel 4100 from the PAAX 4160 to PAAX 4150 (this is a wired connection); 3) wirelessly send the data through the wall, using PAAX 4150 and PAAX 4250; 4) send the data over one or more internal busses in the panel 4200 from PAAX 4250 to PAAX 4240 (another wired connection); and 5) send the data wirelessly from the PAAX 4240 to a PAAX included in, or near, gateway system 5000. By the above method, data is wirelessly transmitted between terminal device 4301 and gateway system 5000 and a connection session can be established between the device 4301 and system 5000.

Figure 7:
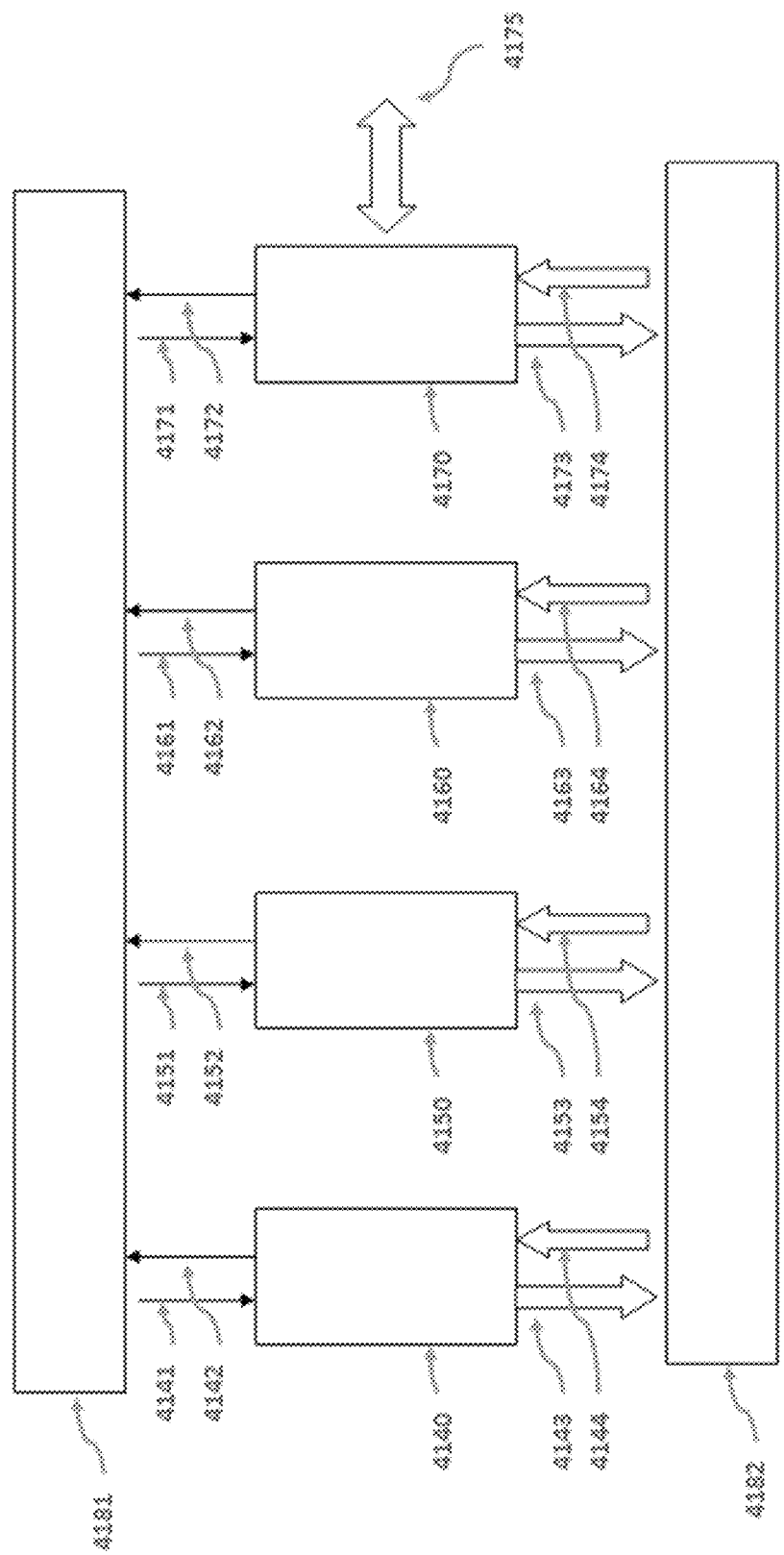
FIG. 7 is schematic illustration of certain components of a panel included in a disclosed wireless communication system.

FIG. 7 is schematic illustration of certain components of the panel 4100 included in the wireless communication system 4000. Both panels 4100 and 4200 may include the components shown in FIG. 7. Boxes 4140, 4150 and 4160 include the PAAXs each having functionality that has been described above in connection with FIGS. 2-6. Box 4170 is a diagnostic circuit which provides access through connector 4175. A controller 4181 controls overall operation of the panel 4100. The controller 4181 may include the controller described in connection with FIG. 1. A high speed digital bus 4182 is couple to the controller 4181 and allows the controller 4181 to manage flow of digital data among PAAX blocks 4140, 4150, 4160 and the diagnostic circuit 4170.

Ports 4141, 4151, 4161, 4171 allow the controller 4181 to send control information to each of the PAAX blocks 4140, 4150, 4160 and diagnostic circuit 4170, respectively, to control configuration and operation of the PAAXs and diagnostic circuit. Ports 4142, 4152, 4162, 4172 allow each PAAX and the diagnostic circuit, respectively, to send status information and interrupt requests to controller 4181.

Ports 4143, 4153, 4163, 4173 allow each of the PAAX blocks 4140, 4150, 4160 and diagnostic circuit 4170, respectively, to send data over the high speed bus 4182. Ports 4144, 4154, 4164, 4174 allow each of the PAAX blocks 4140, 4150, 4160 and diagnostic circuit 4170, respectively, to receive data from the high speed bus 4182.

Figure 8:
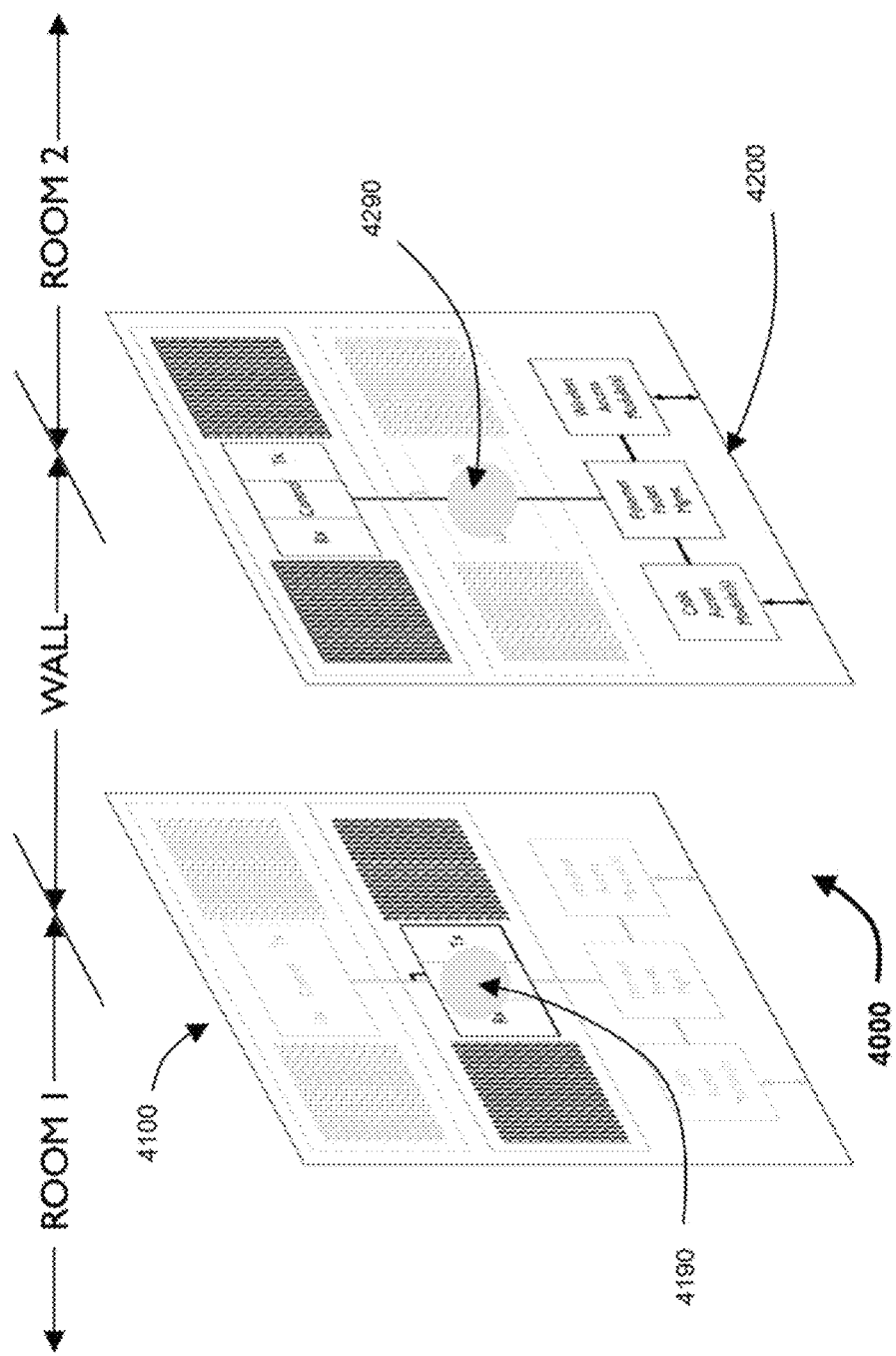
FIG. 8 is a schematic perspective view of a second exemplary wireless communication system including an optional sensor module.

FIG. 8 is a schematic perspective view of the wireless communication system 4000 wherein each of the panels 4100 and 4200 including an optional sensor module 4190, 4290, respectively. The optional module 4190 may be embedded within panel 4100; and the optional module 4290 may be embedded within panel 4200. The sensor modules 4190, 4290 may have the same functionality, structure or components. For example, the sensor module 4190 may include a processor, such as one or more microprocessors, and sensors and/or actuators that perform functions such as the following: 1) monitor location of the panel; 2) monitor distance to other wireless systems and/or terminal devices; 3) monitor environmental parameters, such as temperature, humidity and the like; 4) sense activity relevant to safety and security such as the presence of smoke or dangerous gases or intruders moving around in a room. The module 4190 may include an auxiliary wireless interfaces, such as Wi-Fi components, for example an IEEE 802.11ac transceiver and/or an IEEE 802.11az localization element. The module 4190 may also include a Bluetooth transceiver. The module 4190 may connect to panel 4100 and communication with the controller 4181 via port 4175.

Figure 9:
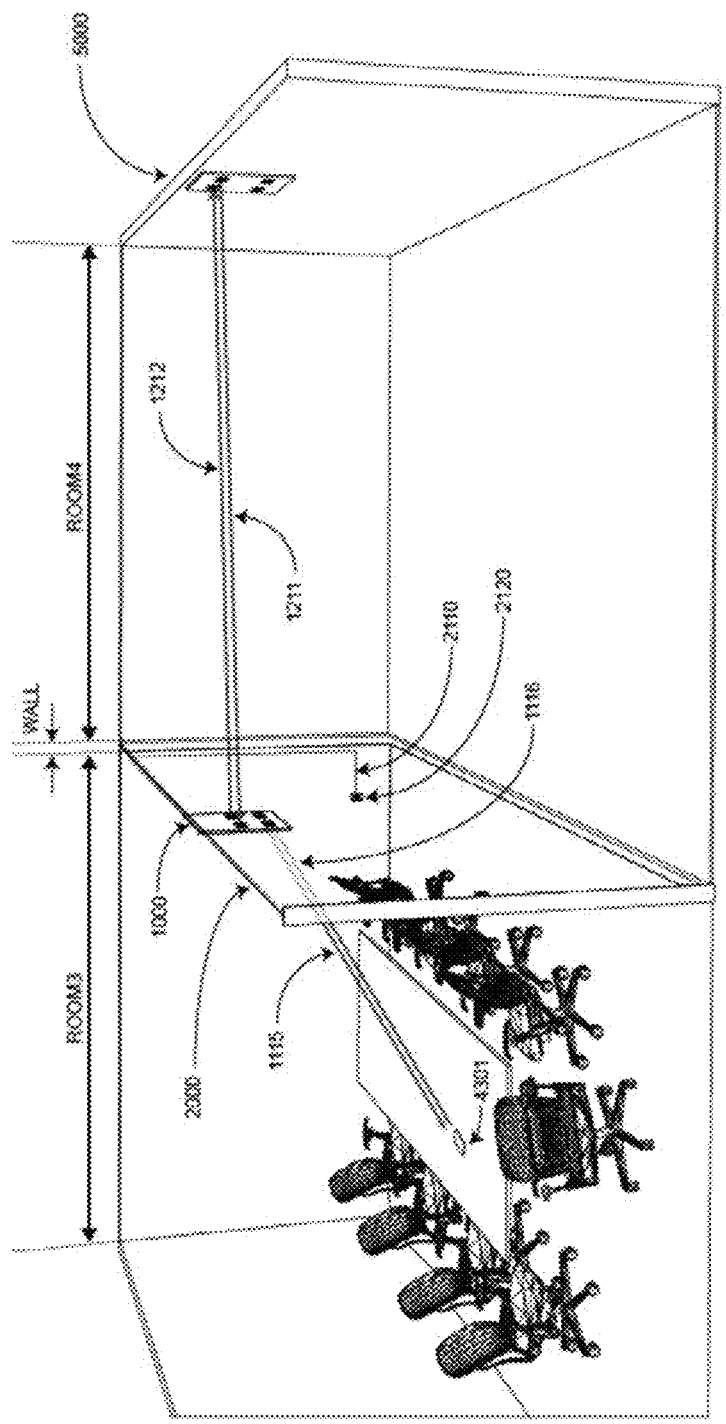
FIG. 9 is a contextual schematic illustration of a third exemplary wireless communication network in an enterprise environment, which includes a disclosed wireless communication system.

FIG. 9 is a contextual schematic illustration of a third exemplary wireless communication network in an enterprise environment, which includes a first wireless communication system 1000 communicating with a second wireless system 5000. The systems 1000, 5000 provide high-speed connectivity within an exemplary enterprise. The system 1000 is similar in function to the system 4000 described above, but differs as follows: 1) the system 1000 has only a single panel, mounted on the room 3 side of wall 2000; 2) the system 1000 communicates with system 5000 by wirelessly passing an V-Band beam through the wall 2000 into room 4; 3) the system 1000 connects to auxiliary power and communication using an Ethernet cable 2110 and power-over-Ethernet (POE) connector 2120. The wall 2000 can be glass, or it can be any other building material.

In this scenario it is possible to place the system 1000 on either side wall 2000. Asymmetry of link margins may generally determine which side is the best choice. In the case of weak link margin to terminal device 4301 and strong V-Band link margin to the system 5000, it may be better to place the system 1000 on the room 3 side of the wall 2000. Once the link placement has been determined, configuration and calibration circuitry and algorithms within the system 1000 can reduce the link power to the lowest satisfactory level. Consequently, system power may be reduced.

Solving Maxwell's equations under the specific conditions that apply within a given interior environment leads to useful estimates of the link margin for a given communication system. The relevant properties of the wall building materials may be used to calculate the link margins of wireless communication paths between systems and devices in the network. The relevant building material properties for such calculations may include: thickness, complex permittivity, attenuation, loss-tangent, and scattering coefficient.

In order to achieve adequate link margin, it is often desirable to use large arrays with narrow beams. However, in some circumstance, narrow beams may exacerbate the problem of beam misalignment.

Figure 10:
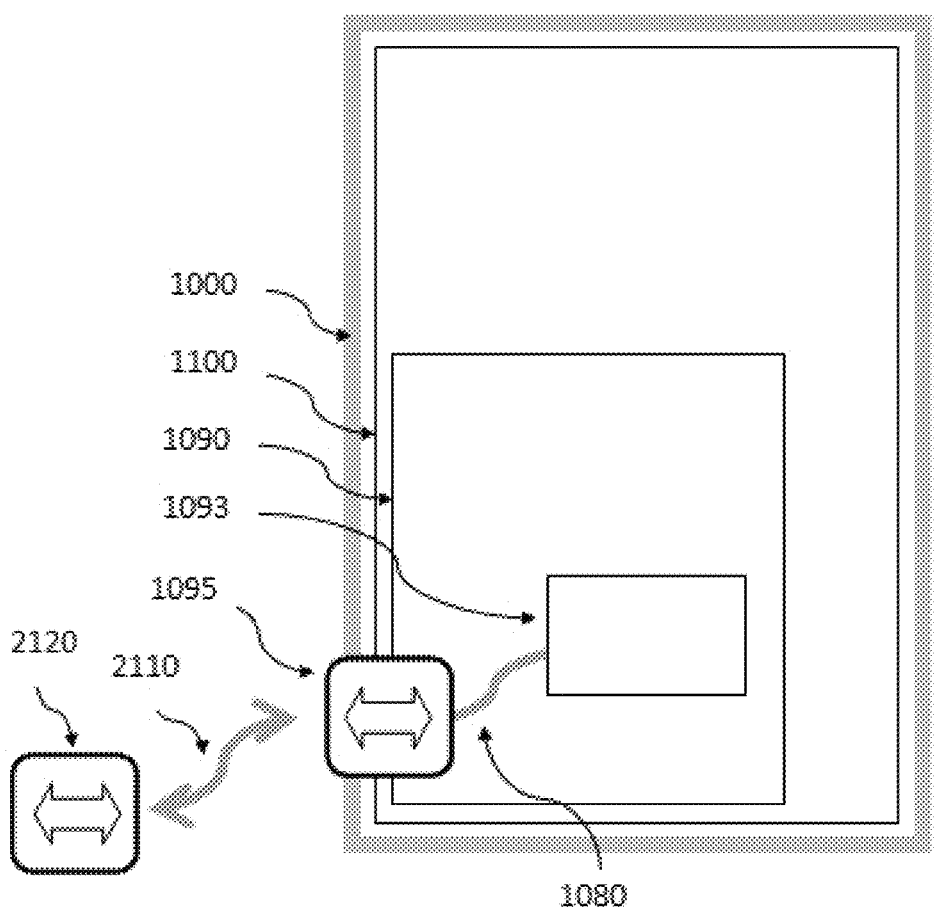
FIG. 10 is a schematic illustration of certain exemplary power supply components of a panel of a wireless system.

FIG. 10 is a schematic illustration of certain components of the panel 1100 including the optional wired communication module 1090. FIG. 10 shows how a POE (power over Ethernet) circuit 1093 may be used in order to efficiently provide both power and data to the system 1100. In this configuration, the POE circuit 1093 is included within module 1090, along with a standard RJ45 connector 1095. The cable 2110 plugs into the RJ45 connector 1095 and into a POE connector 2120 in the wall 2000 of room 3.

Figure 11:
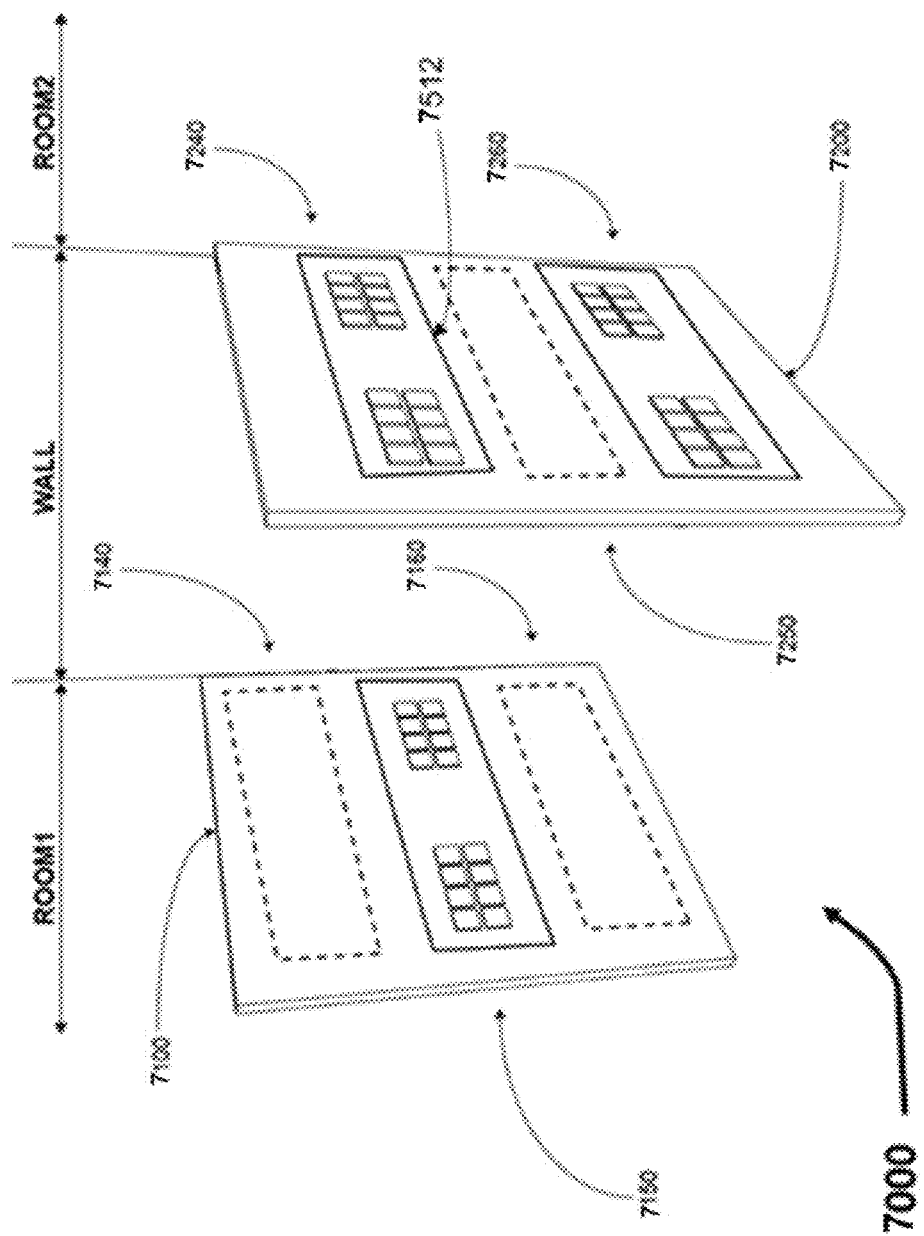
FIG. 11 is a first schematic perspective view of a second exemplary wireless communication system includable in the wireless networks disclosed herein.

FIG. 11 is a first schematic perspective view of a second exemplary wireless communication system 7000 includable in the wireless networks disclosed herein, e.g., the network shown in FIGS. 2a-b and 9. The system 7000 may be replicated and used as any of systems 1000, 4000, 5000, 5001 of the network depicted in FIGS. 2a-b and 9. The predominant difference between the system 7000 and the other disclosed wireless systems 100, 4000 is that the system 7000 includes E-Band or V-Band local communication interfaces to terminal devices.

The system 7000 includes two separate panels 7100, 7200, which are each mounted to opposite sides of a wall separating room 1 and room 2, respectively. The panels 7100, 7200 are substantially aligned with each other so that relatively narrow millimeter-wave beams can be successfully transfer data between the panels 7100, 7200 through the wall. The system 7000 may be installed on two sides of a wall that separates room 1 and room 2. The height of the installation may be seven feet above the floor, but installation height is not constrained to any height.

Installation, alignment, and configuration of the system 7000 may be controlled by a separate wand that is in wireless communication with the panels 7100, 7200. The wand may include a user interface, a display, and a Bluetooth interface that can pair with each panel 7100, 7200. For example, the wand may be a 'rooting' a Nexus 6 smartphone with an operating system and application software for interfacing with the panels 7100, 7200.

Installation and alignment of the panels 7100, 7200 on a wall can be accomplished using the following method: 1) panel 7100 is attached to the wall, and connected to power (wall outlet) and turned on; 2) using the Bluetooth link, the panel 7100 and wand are paired; 3) the second panel 7200 is temporarily attached to the other side of the wall, and connected to power (wall outlet) and turned on; 4) the second panel 7200 is moved on the wall until a green "Alignment OK" indicator is displayed by the wand; 5) the second panel 7200 is then permanently attached to the wall; 6) a "join network" button is pushed on the wand, causing the first and second panel 7100, 7200 to establish communications between each other and other network elements over the wireless links; and 7) the wand displays an "Installation OK" message once the panels 7100, 7200 communicate to the wand over the Bluetooth link that they have successfully connect to the network.

Once installed, the panels 7100 and 7200 make up the system 7000.

The system 7000 may transmit and receive information at E-Band frequencies to/from room 1 and room 2. The system 7000 may also transmit and receive V-Band traffic within room 1 and room 2.

In this example, each of the panels 7100, 7200 contains three circuits of phased array antennas with embedded transceiver and control electronics (PAAXs). With the advent of deep submicron CMOS technology, phased array antennas with embedded transceiver and control electronics (PAAX) have become a practical implementation.

The first panel 7100 includes a first PAAX 7140, a second PAAX 7150, and a third PAAX 7160. The first and third PAAXs 7140, 7160 each have two phased array antennas on one side of the panel 7100 directed toward room 1. The second PAAX 7150 has two phased array antennas on the other side of the panel 7100 facing the wall. Likewise, the second panel 7200 includes a first PAAX 7240, a second PAAX 7250, and a third PAAX 7260. The first and third PAAXs 7240, 7260 each have two phased array antennas on one side of the panel 7200 directed toward room 2. The second PAAX 7250 has two phased array antennas on the other side of the panel 7200 facing the wall.

The system 7000 may be configured so that the first panel 7100 provides full duplex FDD on the E-Band frequencies using the first PAAX 7140 in room 1; full duplex FDD on the V-Band frequencies using the third PAAX 7160 in room 1; and full duplex FDD on the V-Band frequencies using the second PAAX 7150 through the wall. And the second panel 7200 provides full duplex FDD on the E-Band frequencies using its first PAAX 7240 in room 2; full duplex FDD on the V-Band frequencies using the third PAAX 7260 in room 2; and full duplex FDD on the V-Band frequencies using the second PAAX 7250 through the wall.

Each PAAX has control circuitry for electrically setting beamformer parameters. Beamformer parameters may control either the width of the beam, or the direction in which the beamformer points, or both. The control may be asserted by the following means: 1) embedding switches within the PAA and using such switches to reconfigure conductive elements which comprise the PAA; 2) phase-shifting the signals sent to or received from elements of the PAA; and/or 3) digitally generating incremental delay among the signals sent to individual antenna elements.

Crosstalk among the beams is reduced by in the following ways. First, the physical design of the panels minimizes the level of Tx fields that are seen by Rx PAAs. Second, reflectors of millimeter-wave radiation may be embedded within the panels 7100, 7200. Thickness of the reflectors is optimized and simulated in order to ensure that the efficiency benefit gained thereby is not cancelled by the signal degradation caused by multipath propagation introduced by said reflectors. And third, attenuators may be embedded within the panels. The attenuators may be implemented as metamaterials or by conventional lossy materials.

Each PAAX may include beamforming-control circuits, transmitter-drive circuits, RF lens and enclosure elements.

Design of the V-Band and E-Band antennas used within the PAAXs is now discussed. In some configurations, there is no need for a Tx/Rx switch because Tx and Rx antenna elements are implemented as subarrays within each PAAX. Elimination of Tx/Rx switch results in elimination of losses and parasitics associated with the switch. Consequently, link margin is improved.

Each PAAX may be an adaptive array system, which uses adaptive nulling, beam forming, and beam steering. Because antenna elements as well as transceiver elements are embedded within each PAAX, there may be no need for a power combiner or transmission line in the Tx antenna array. Economic costs and performance degradation associated with the power combiner and said transmission line can thus be avoided. Each antenna may be a dedicated integral phased array antenna as defined by European Telecommunications Standards Institute (ETSI). It features dynamic auto-alignment and installation alignment. The antenna is not required to be a stand-alone antenna or a selectable beam antenna. However, some configurations of the system 7000 can be built using selectable beam antennas or stand-alone antennas.

In other embodiments, each panel 7100, 7200 may have a greater or fewer number of PAAXs and each panel 7100, 7200 may have a different number of PAAXs than the other panel.

Figure 12:
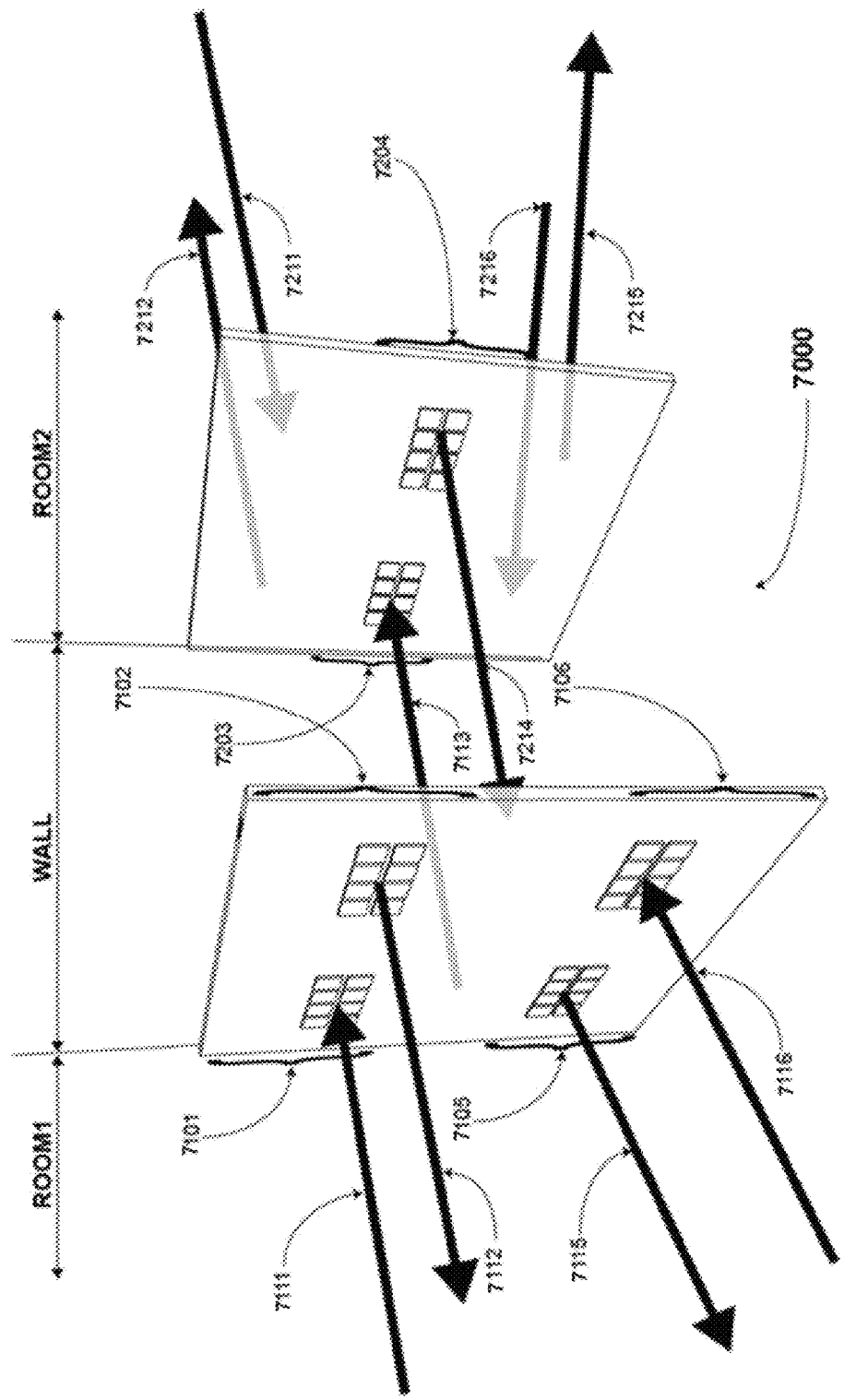
FIG. 12 is a second schematic perspective view of the second exemplary wireless communication system.
Figure 13:
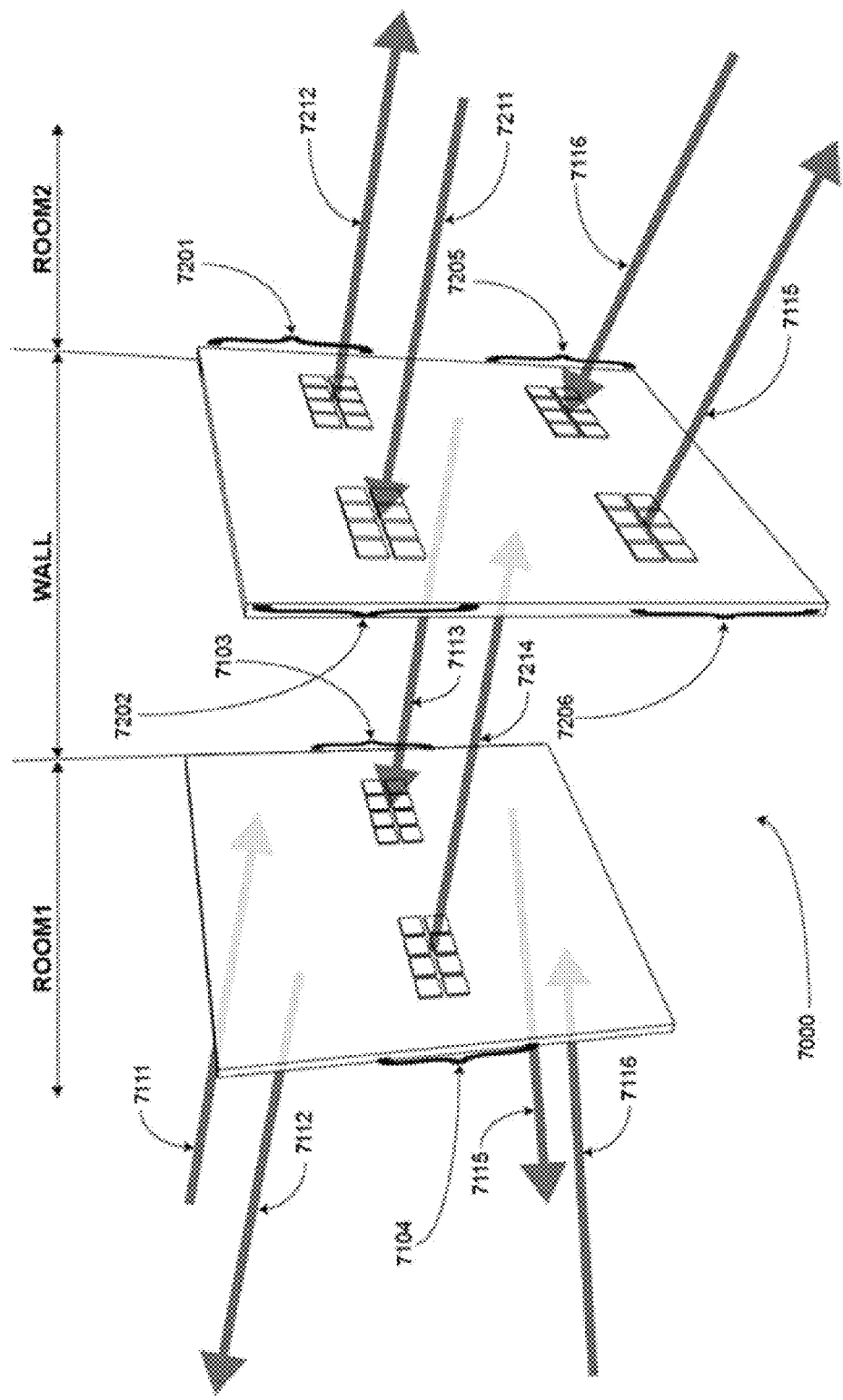
FIG. 13 is a third schematic perspective view of the second exemplary wireless communication system.

FIGS. 12 and 13 are second and third schematic perspective views, respectively, of the second exemplary wireless communication system 7000. These views show further details of the wireless beam data flows and structure of the system 7000. Table 2 summarizes the panels and their transmit (Tx) and receive (Rx) components by the element numbers shown in FIGS. 12 and 13, along with the element numbers of the corresponding millimeter wave beams.

TABLE 2

Rx and Tx components of panel.

| panel | Ref number | Frequency <GHz> | function | direction | Beam number | PAAX number |
|---|---|---|---|---|---|---|
| 7100 | 7101 | 81-86 | RX | Room 1 | 7111 | 7140 |
| 7100 | 7102 | 71-76 | TX | Room 1 | 7112 | 7140 |
| 7100 | 7103 | 81-86 | TX | Wall | 7113 | 7150 |
| 7100 | 7104 | 71-76 | RX | Wall | 7214 | 7150 |
| 7100 | 7105 | 60 | TX | Room 1 | 7115 | 7160 |
| 7100 | 7106 | 60 | RX | Room 1 | 7116 | 7160 |
| 7200 | 7202 | 71-76 | RX | Room2 | 7211 | 7240 |
| 7200 | 7201 | 81-86 | TX | Room2 | 7212 | 7240 |
| 7200 | 7203 | 81-86 | RX | Wall | 7113 | 7250 |
| 7200 | 7204 | 71-76 | TX | Wall | 7214 | 7250 |
| 7200 | 7206 | 60 | TX | Room2 | 7215 | 7260 |
| 7200 | 7205 | 60 | RX | Room2 | 7216 | 7260 |

In the example system 7000 shown in FIGS. 12 and 13, there are six wireless links, each having a pair of beams. There are two links per room, and two links through the wall. As shown in FIG. 12, in the first link wireless beams 7111 and 7112 carry traffic, including data and control information, that is flowing between the system 7000 and other wireless communication system(s) located within room 1. In this example, the traffic is transmitted and received at E-Band frequencies, for example, those shown in Table 2. Also at E-Band frequencies, beams 7113 and 7214 of the second link carry information which flows through the wall between the panels 7100 and 7200 located in room 1 and room 2. Beams 7212 and 7211 of the third link carry traffic which is flowing between the system 7000 and other system(s) in room 2. The traffic carried by the first, second and third wireless links may be transmitted and received at E-Band frequencies, as shown in Table 2. In this example, beams 7115 and 7116 of the fourth link carry traffic at V-Band frequencies flowing between PAAX 7160 of the first panel 7100 and terminal access points within room 1. Also in this example, beams 7215 and 7216 of the fifth link carry traffic at V-Band frequencies flowing between PAAX 7260 and terminal access points within room 2.

Each of the panels 7100, 7200 includes a plurality of millimeter-wave receivers (Rx's) and a plurality of millimeter-wave transmitters (Tx's). The phased-array antennas of each panel 7100, 7200 may be permanently electrically connected to either Rx or Tx RF front end circuitry, respectively. Correspondence between RF circuits 7101-7106 and 7201-7206 and area of the panels is shown in FIGS. 12 and 13 and given in Table 2.

Each of the Rx circuits 7102, 7103, 7106, 7203, 7202, 7205 generates a respective digital bit stream that corresponds to the waveform of the millimeter-wave signal (beams) incident on the corresponding antenna array. Error correction may be performed on each of the bit streams within the transceiver associated with the PAAX that contains the Rx circuit.

The data flow through the wall uses the second wireless links represented as beams 7113 and 7214. In order to reduce attenuation and other forms of signal degradation, the beams 7113, 7214 are generally normal to the surface of the wall. PAA elements of each PAAX 7150, 7250 of the panels 7100, 7200 are aligned to ensure that each Rx PAA captures the greatest possible proportion of the energy emitted by corresponding Tx PAA of the opposing panel. The proportion of energy received may depend on the exact shape of beams generated by the Rx and Tx PAAs on the panels 7100, 7200. Link margin can be adjusted by modifying the antenna gain, power and noise figure of the Rx PAA and corresponding Tx PAA. For example, antenna gain can be increased by using a larger number of elements within either or both corresponding PAAs of a given beam path. Data passing through the wall may transmitted wirelessly using E-Band.

The system 7000 contains digital circuitry for management of dataflow between bitstreams of the various Rx circuits and digital inputs of the Tx circuits. The digital circuitry also provides leaf-level management of beamforming activity and system power. The digital circuitry may include one or more controllers in each panel 7100, 7200, such as the control described in connection with FIG. 1.

Other configurations of the disclosed wireless systems are possible. For example, the PAAXs in each panel, as well as the other components, can be placed in different physical arrangements on the panels. For instance, the PAAXs can be arranged so that their antenna pairs are stacked vertically, rather than horizontally as shown in the figures.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially. In addition, while certain aspects of this disclosure are described as being performed by a single module or component for purposes of clarity, it should be understood that the functions described in this disclosure may be performed by any suitable combination of components or modules associated with a wireless communication network.

The foregoing description is illustrative and not restrictive. Although certain exemplary embodiments have been described, other embodiments, combinations and modifications involving the invention will occur readily to those of ordinary skill in the art in view of the foregoing teachings. Therefore, the invention is to be limited only by the following claims, which cover one or more of the disclosed embodiments, as well as all other such embodiments and modifications when viewed in conjunction with the above specification and accompanying drawings.

What is claimed is:

1. An apparatus, comprising:
a panel having a first side opposing a second side;
a first millimeter wave transmitter circuit mounted to the panel;
a first phased array antenna mounted on the first side of the panel and operatively coupled to the first millimeter wave transmitter circuit, adapted to emit a first millimeter wave beam within a first frequency band;
a first millimeter wave receiver circuit mounted to the panel;
a second phased array antenna mounted on the first side of the panel and operatively coupled to the first millimeter wave receiver circuit, adapted to receive a second millimeter wave beam within a second frequency band;
a second millimeter wave transmitter circuit mounted to the panel;
a third phased array antenna mounted on the second side of the panel and operatively coupled to the second millimeter wave transmitter circuit, adapted to emit a third millimeter wave beam through an obstruction, the third millimeter wave beam within the second frequency band;
a second millimeter wave receiver circuit mounted to the panel;
a fourth phased array antenna mounted on the second side of the panel and operatively coupled to the second millimeter wave receiver circuit, adapted to receive a fourth millimeter wave beam through the obstruction, the fourth millimeter wave beam within the first frequency band; and
at least one controller adapted to transfer data between the second millimeter wave receiver circuit and the first millimeter wave transmitter circuit and to transfer data between the first millimeter wave receiver circuit the second millimeter wave transmitter circuit;
wherein the first frequency band and the second frequency band are each above 30 GHz.

2. The apparatus of claim 1, wherein the panel includes means for mounting the panel to a wall.

3. The apparatus of claim 1, wherein the panel is substantially flat.

4. The apparatus of claim 1, further comprising:
a wireless transceiver, operatively coupled to the controller, configured to communicate with one or more terminal devices.

5. The apparatus of claim 4, further comprising a packet manager adapted to manage data transfer between the controller and the wireless transceiver.

6. The apparatus of claim 1, further comprising an attenuator adapted to attenuate millimeter wave signals.

7. The apparatus of claim 1, further comprising a reflector adapted to reflect millimeter wave signals.

8. The apparatus of claim 1, further comprising control circuitry adapted to set beamforming parameters for at least one of the first, second, third, and fourth phased array antennas.

9. The apparatus of claim 1, further comprising power-over-Ethernet (POE) circuitry adapted to provide power to the apparatus.

10. A system, comprising:
a first panel having a first side opposing a second side;
a first wireless transceiver mounted to the first panel;
a first phased array antenna, operatively coupled to the first wireless transceiver and mounted to the first side of the first panel, the first phased array antenna adapted to emit a first millimeter wave beam;
a second phased array antenna, operatively coupled to the first wireless transceiver and mounted to the first side of the first panel, the second phased array antenna adapted to receive a second millimeter wave beam;
a second wireless transceiver mounted to the first panel;
a third phased array antenna, operatively coupled to the second wireless transceiver and mounted to the second side of the first panel, the third phased array antenna adapted to emit a third millimeter wave beam;
a fourth phased array antenna, operatively coupled to the second wireless transceiver and mounted to the second side of the first panel, the fourth phased array antenna adapted to receive a fourth millimeter wave beam;
a second panel, not attached to the first panel, having a first side opposing a second side;
a third wireless transceiver mounted to the second panel;
a fifth phased array antenna, operatively coupled to the third wireless transceiver and mounted to the first side of the second panel, the fifth phased array antenna adapted to emit a fifth millimeter wave beam;
a sixth phased array antenna, operatively coupled to the third wireless transceiver and mounted to the first side of the second panel, the sixth phased array antenna adapted to receive a second millimeter wave;
a fourth wireless transceiver mounted to the second panel;
a seventh phased array antenna, operatively coupled to the fourth wireless transceiver and mounted to the second side of the second panel, the seventh phased array antenna adapted to emit the fourth millimeter wave beam; and
an eighth phased array antenna, operatively coupled to the fourth wireless transceiver and mounted to the second side of the second panel, the eighth phased array antenna adapted to receive the third millimeter wave beam.

11. The system of claim 10, wherein the first panel and the second panel are each substantially flat.

12. The system of claim 10, wherein the first panel includes means for mounting the first panel to a first side of a wall, and the second panel includes means for mounting the second panel to a second side of the wall.

13. The system of claim 10, further comprising means for aligning the first panel with the second panel.

14. The system of claim 10, further comprising:
a fifth wireless transceiver mounted to the second panel;
a first antenna, operatively coupled to the fifth wireless transceiver, adapted to emit a first wireless signal; and
a second antenna, operatively coupled to the fifth wireless transceiver, adapted to receive a second wireless signal.

15. The system of claim 10, further comprising:
a first controller, mounted to the first panel, adapted to manage data transfer between the first wireless transceiver and the second wireless transceiver.

16. The system of claim 15, further comprising:
a second controller, mounted to the second panel, adapted to manage data transfer between the third wireless transceiver and the fourth wireless transceiver.

17. A method of wireless communication, comprising:
receiving at a first phased array antenna a first millimeter wave beam carrying data, the first phased array antenna mounted on a first side of a first panel;
transferring the data through a first transceiver to a second phased array antenna mounted on a second side of the first panel;
transmitting through an obstruction, using the second phased array antenna, a second millimeter wave beam carrying the data;

receiving the second millimeter wave beam at a third phased array antenna located at an opposite side of the obstruction from the second phased array antenna the third phased array antenna mounted on a first side of a second panel;

transferring the data through a second transceiver to a fourth phased array antenna mounted on a second side of the second panel; and transmitting from the fourth phased array antenna, a third millimeter wave beam carrying the data;

wherein the first millimeter wave beam, the second millimeter wave beam, and the third millimeter wave beam are each above 30 GHz.

18. The method of claim 17, further comprising: setting beamforming parameters for at least one of the first, second, third, and fourth phased array antennas.

19. The method of claim 17, further comprising:

aligning the second phased array antenna with the third phased array antenna.

* * * * *